United States Patent
Choi et al.

(10) Patent No.: US 12,413,761 B2
(45) Date of Patent: *Sep. 9, 2025

(54) VIDEO DECODING METHOD AND APPARATUS USING MULTI-CORE TRANSFORM, AND VIDEO ENCODING METHOD AND APPARATUS USING MULTI-CORE TRANSFORM

(71) Applicant: SAMSUNG ELECTRONICS CO., LTD., Suwon-si (KR)

(72) Inventors: Ki-ho Choi, Seoul (KR); Min-soo Park, Seoul (KR); Elena Alshina, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,205

(22) Filed: May 6, 2024

(65) Prior Publication Data

US 2024/0292014 A1 Aug. 29, 2024

Related U.S. Application Data

(63) Continuation of application No. 18/094,805, filed on Jan. 9, 2023, now Pat. No. 12,003,750, which is a
(Continued)

(51) Int. Cl.
*H04N 19/44* (2014.01)
*H04N 19/122* (2014.01)
(Continued)

(52) U.S. Cl.
CPC ........... *H04N 19/45* (2014.11); *H04N 19/122* (2014.11); *H04N 19/159* (2014.11); *H04N 19/176* (2014.11); *H04N 19/186* (2014.11)

(58) Field of Classification Search
CPC ............................. H04N 19/45; H04N 19/122
(Continued)

(56) References Cited

U.S. PATENT DOCUMENTS 8,611,687 B2    12/2013    Lee et al.
8,683,468 B2    3/2014    Breternitz et al.
(Continued)

FOREIGN PATENT DOCUMENTS

CN    103370939 A    10/2013
CN    103534686 A    1/2014
(Continued)

OTHER PUBLICATIONS

Philippe et al, "EE2: Adaptive Primary Transform improvement" 4. JVET Meeting; 15-10-2016-21-10-2016; Chengdu; (The Join Video Exploration Team of ISO/IECJTC1/SC29/WG11andITU-TSG. 16); URL: http://phenix.int-evry.frajvet/ ,,No. JVET-D0065 (Year: 2016).*

(Continued)

*Primary Examiner* — Amir Shahnami
(74) *Attorney, Agent, or Firm* — Sughrue Mion, PLLC

(57) ABSTRACT

A method and apparatus for performing transformation and inverse transformation on a current block by using multi-core transform kernels in video encoding and decoding processes. A video decoding method may include obtaining, from a bitstream, multi-core transformation information indicating whether multi-core transformation kernels are to be used according to a size of a current block; obtaining horizontal transform kernel information and vertical transform kernel information from the bitstream when the multi-core transformation kernels are used according to the multi-core transformation information; determining a horizontal transform kernel for the current block according to the horizontal transform kernel information; determining a vertical transform kernel for the current block according to the (Continued)

vertical transform kernel information; and performing inverse transformation on the current block by using the horizontal transform kernel and the vertical transform kernel.

3 Claims, 20 Drawing Sheets

Related U.S. Application Data continuation of application No. 16/613,184, filed as application No. PCT/KR2018/007506 on Jul. 3, 2018, now Pat. No. 11,589,066.

(60) Provisional application No. 62/528,483, filed on Jul. 4, 2017.

(51) Int. Cl.
*H04N 19/159* (2014.01)
*H04N 19/176* (2014.01)
*H04N 19/186* (2014.01)

(58) Field of Classification Search
USPC ...................................................... 375/240.2
See application file for complete search history.

(56) References Cited

U.S. PATENT DOCUMENTS

| | | | |
|---|---|---|---|
| 9,584,810 | B2 | 2/2017 | Kim et al. |
| 9,787,988 | B2 | 10/2017 | Song et al. |
| 10,123,014 | B2 | 11/2018 | Lim et al. |
| 10,575,015 | B2 | 2/2020 | Lee et al. |
| 10,742,988 | B2 | 8/2020 | Koo et al. |
| 2010/0315522 | A1 | 12/2010 | Tsurumi |
| 2012/0127002 | A1 | 5/2012 | Shibahara et al. |
| 2012/0297163 | A1 | 11/2012 | Breternitz et al. |
| 2012/0328003 | A1 | 12/2012 | Chien et al. |
| 2013/0016782 | A1 | 1/2013 | Sasai et al. |
| 2014/0105284 | A1 | 4/2014 | Lim et al. |
| 2015/0055697 | A1 | 2/2015 | Wu et al. |
| 2016/0353112 | A1 | 12/2016 | Zhang et al. |
| 2017/0013269 | A1 | 1/2017 | Kim et al. |
| 2017/0188029 | A1 | 6/2017 | An et al. |
| 2017/0318297 | A1 | 11/2017 | Puri et al. |
| 2018/0041776 | A1 | 2/2018 | Kim et al. |
| 2018/0288407 | A1* | 10/2018 | Lee ...................... H04N 19/159 |
| 2019/0149822 | A1 | 5/2019 | Kim et al. |
| 2022/0060751 | A1 | 2/2022 | Nam et al. |
| 2023/0247229 | A1 | 8/2023 | Kim et al. |

FOREIGN PATENT DOCUMENTS

| | | |
|---|---|---|
| CN | 104378637 A | 2/2015 |
| CN | 104427335 A | 3/2015 |
| CN | 105120272 A | 12/2015 |
| CN | 105163131 A | 12/2015 |
| CN | 106060555 A | 10/2016 |
| EP | 3 661 214 A1 | 6/2020 |
| JP | 2011-151524 A | 8/2011 |
| KR | 10-2011-0126567 A | 11/2011 |
| KR | 10-2012-0046725 A | 5/2012 |
| KR | 10-2014-0019011 A | 2/2014 |
| KR | 10-2014-0034209 A | 3/2014 |
| KR | 10-1651759 B1 | 8/2016 |
| WO | 2012/161445 A1 | 11/2012 |
| WO | 2015/172694 A1 | 11/2015 |
| WO | 2016/129872 A1 | 8/2016 |
| WO | 2016/143991 A1 | 9/2016 |
| WO | 2017/042434 A1 | 3/2017 |
| WO | 2017/061671 A1 | 4/2017 |
| WO | 2020/226424 A1 | 11/2020 |

OTHER PUBLICATIONS

Alshina et al, "Performance of JEM1.0 tools analysis by Samsung," Joint Video Exploration Team (JVET) of ITU-T SG 16 WP 3 and ISO/IEC JTC 1/SC 29/WG 11, Document: JVET-B0022_rl, Feb. 2016, Total 54 pages.
Biatek et al, "Adaptive Transform Sets for Inter Coding", 4. JVET Meeting; 15-10-2016-21-10-2016; Chengdu: (The Joint Video Exploration Team of ISO/IEC JTC1/SC29/WG11 and ITC-T SG.16); URL: http://phenix.int-evry.fr/jvet/No. JVET-D0070, Oct. 5, 2016 (Year :2016).
Biatek, T., et al., "Adaptive Transform Sets for Inter Coding", Joint Video Exploration Team (JVET) of ITU-T SG 16 WP 3 and ISO/IEC JTC 1/SC 29/WG 11, Document: JVET-D0070, Oct. 15-21, 2016, XP030150303, pp. 1-6.
Chen et al., "Algorithm Description of Joint Exploration Test Model 2," Joint Video Exploration Team (JVET) of ITU-T SG 16 WP 3 and ISO/IEC JTC 1/SC 29/WG 11, Document: JVET-B1001 v3, Feb. 2016, Total 32 pages.
Chen, J., et al., "Algorithm Description of Joint Exploration Test Model 5 (JEM 5)", Joint Video Exploration Team (JVET) of ITU-T SG 16 WP 3 and ISO/IEC JTC 1/SC 29/WG 11, Document: JVET-E1001-v2, Jan. 12-20, 2017, XP055580972, pp. 1-41 (44 pages).
Communication dated Apr. 3, 2023, issued by the Korean Intellectual Property Office in Korean Patent Application No. 10-2022-7013105.
Communication dated Dec. 20, 2022, issued by the INDIA Intellectual Property Office in Indian Patent Application No. 202248049997.
Communication dated Dec. 20, 2022, issued by the INDIA Intellectual Property Office in Indian Patent Application No. 202248050004.
Communication dated Dec. 22, 2022, issued by the Korean Intellectual Property Office in Korean Patent Application No. 10-2022-7013105.
Communication dated Dec. 8, 2022, issued by the National Intellectual Property Administration, PRC in counterpart Chinese Application No. 202210305135.3.
Preliminary Opinion dated Nov. 15, 2023, issued by European Patent Office in European Patent Application No. 18827632.3.
Communication dated Dec. 8, 2022, issued by the National Intellectual Property Administration, PRC in counterpart Chinese Application No. 202210305376.8.
Communication dated Dec. 8, 2022, issued by the National Intellectual Property Administration, PRC in counterpart Chinese Application No. 202210305627.2.
Communication dated Dec. 8, 2022, issued by the National Intellectual Property Administration, PRC in counterpart Chinese Application No. 202210307004.9.
Communication dated Jan. 24, 2024, issued by the Intellectual Property Office of India in Indian Application No. 201947048277.
Communication dated Jun. 30, 2023, issued by the National Intellectual Property Administration, PRC in counterpart Chinese Application No. 202210305135.3.
Communication dated Jun. 30, 2023, issued by the National Intellectual Property Administration, PRC in counterpart Chinese Application No. 202210305376.8.
Communication dated Jun. 30, 2023, issued by the National Intellectual Property Administration, PRC in counterpart Chinese Application No. 202210305627.2.
Communication dated Jun. 30, 2023, issued by the National Intellectual Property Administration, PRC in counterpart Chinese Application No. 202210307004.9.
Communication dated Mar. 30, 2020 from the European Patent Office in application No. 18827632.3.
Communication dated Mar. 30, 2022 issued by the Intellectual Property India Patent Office in application No. 201947048277.
Communication dated May 11, 2023, issued by the European Patent Office in counterpart European Application No. 18 827 632.3.
Communication dated May 20, 2022 issued by the Australian Patent Office in Australian Application No. 2018295861.

(56) References Cited

OTHER PUBLICATIONS

Communication dated May 24, 2021 issued by the State Intellectual Property Office of P.R. China in counterpart Chinese Application No. 201880040863.8.
Communication dated May 30, 2023, issued by the Vietnamese Intellectual Property Office in Vietnamese Patent Application No. 1-2020-00523.
Communication issued Jun. 24, 2022 by the Korean Intellectual Property Office in counterpart Korean Patent Application No. 10-2022-7013105.
Communication dated Dec. 30, 2022, issued by the India Intellectual Property Office in Indian Patent Application No. 202248050009.
Communication dated Dec. 28, 2022, issued by the India Intellectual Property Office in Indian Patent Application No. 202248050067.
Lorcy, V., et al., "EE2: Adaptive Primary Transform improvement", Joint Video Exploration Team (JVET) of ITU-T SG 16 WP 3 and ISO/IEC JTC 1/SC 29/WG 11, Document: JVET-D0065, Oct. 15-21, 2016, XP030150298, pp. 1-7.
Notice of Allowance dated Oct. 10, 2023, issued by Korean Patent Office in Korean Patent Application No. 10-2022-7013105.
Philippe et al, "EE2: Adaptive Primary Transform Improvement" 4. JVET Meeting; 15-10-2016-21-10-2016; Chengdu; (The Join Video Exploration Team of ISO/IEC JTC1/SC29/WG11 and ITU-T SG. 16); URL: http://phenix.int-evry.fr/jvet/,,No. JVET-D0065, Oct. 5, 2016 (Year: 2016).
Seregin et al, "EE2: Grouped signalling for transform", 4. JVET Meeting; 15-10-2016-21-10-2016; Chengdu; (The Joint Video Exploration Team of ISO/IEC JTC1/SC29/WG11 and ITU-T SG. 16); URL: http://PHENIX.INT-EVRY.FR/JVET/, No. JVET-D0112-v2,Oct. 12, 2016 (Year: 2016).
Seregin, V., et al., "EE2: Grouped signalling for transform", Joint Video Exploration Team (JVET) of ITU-T SG 16 WP 3 and ISO/IEC JTC 1/SC 29/WG 11, Document: JVET-D0112r1, Oct. 15-21, 2016, XP030150358, pp. 1-4.
Written Opinion (PCT/ISA/237) and International Search Report (PCT/ISA/210) dated Oct. 19, 2018, issued by the International Searching Authority in International Application No. PCT/KR2018/007506.
Zhang, "High-speed JPEG decoding algorithm for multi-core processor architectur," China Academic Journal Electronic Publishing House (http://www.cnki.net), Microcontrollers & Embedded Systems, pp. 44-47, 2006, Total 5 pages.
Zhao et al., "Enhanced Multiple Transform for Video Coding," 2016 Data Compression Conference, IEEE, Mar. 2016, pp. 73-82, XP033027689.
Philippe et al, "EE2: Adaptive Primary Transform improvement" 4. JVET Meeting; 15-10-2016-21-10-2016; Chengdu; (The Join Video Exploration Team of ISO/IEC JTC1/SC29/WG11 and ITU-TSG. 16); urlhttpy/phenix.int-evry.frajvet/,, No. JVET-D0065 (Year: 2016).
Communication issued on Dec. 3, 2024 from the Australian Patent Office for Australian Patent Application No. 2024200680.
Communication issued on Nov. 28, 2024 from the Indian Patent Office for Indian Patent Application No. 202248050009.
Communication issued on Nov. 28, 2024 from the Indian Patent Office for Indian Patent Application No. 202248050004.
Communication issued on Nov. 28, 2024 from the Indian Patent Office for Indian Patent Application No. 202248050067.

\* cited by examiner

FIG. 5

| INTRA MODE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|
| HORIZONTAL TRANSFORM KERNEL CANDIDATE | 2 | 1 | 0 | 1 | 0 | 1 | 0 | 1 | 1 | 2 | 2 | 2 | 2 | 1 | 0 | 1 | 0 | 1 | 0 | 1 | 0 | 1 | 0 | 1 | 0 | 0 | 0 | 0 | 0 | 1 | 0 | 1 | 0 | 1 | 0 |
| VERTICAL TRANSFORM KERNEL CANDIDATE | 2 | 1 | 0 | 1 | 0 | 1 | 0 | 1 | 0 | 0 | 0 | 0 | 0 | 1 | 0 | 1 | 0 | 1 | 0 | 1 | 0 | 1 | 0 | 1 | 2 | 2 | 2 | 2 | 2 | 1 | 0 | 1 | 0 | 1 | 0 |

FIG. 6

| TYPE | TRANSFORM KERNEL CANDIDATE |
|---|---|
| INTRA BLOCK | 0: DST7, 1: DCT8 |
| INTER BLOCK | 0: DCT8, 1: DST7 |

FIG. 7

TRANSFORM BASIS FUNCTIONS OF DCT8 AND DST7 FOR N INPUTS

| TRANSFORMATION TYPE | BASIS FUNCTION $T_i(j)$, i, j =0, 1,···, N−1 |
|---|---|
| DCT8 | $T_i(j) = \sqrt{\dfrac{4}{2N+1}} \cdot \cos\left(\dfrac{\pi \cdot (2i+1) \cdot (2j+1)}{4N+2}\right)$ |
| DST7 | $T_i(j) = \sqrt{\dfrac{4}{2N+1}} \cdot \sin\left(\dfrac{\pi \cdot (2i+1) \cdot (j+1)}{2N+1}\right)$ |

FIG. 18

| BLOCK SHAPE / DEPTH | 0: SQUARE | 1: NS_VER | 2: NS_HOR |
|---|---|---|---|
| DEPTH D | 1800 | 1810 | 1820 |
| DEPTH D+1 | 1802 | 1812 | 1822 |
| DEPTH D+2 | 1804 | 1814 | 1824 |
| ... | ... | ... | ... |

VIDEO DECODING METHOD AND APPARATUS USING MULTI-CORE TRANSFORM, AND VIDEO ENCODING METHOD AND APPARATUS USING MULTI-CORE TRANSFORM

CROSS REFERENCE TO RELATED APPLICATION

This is Continuation Application of U.S. application Ser. No. 18,094,805 filed Jan. 9, 2023, which is a Continuation Application of U.S. application Ser. No. 16/613,184 filed Nov. 13, 2019, which is a National Stage of International Application No. PCT/KR2018/007506 filed Jul. 3, 2018, which claims benefit of U.S. Provisional No. 62/528,483 filed on Jul. 4, 2017 in the United States Patent and Trademark Office. the disclosures of which are incorporated herein by reference in their entireties.

TECHNICAL FIELD

The present disclosure relates to a video decoding method and a video decoding apparatus, and proposes a method and apparatus for performing transformation and inverse transformation on a current block by using a transform kernel selected from multi-core transformation according to various encoding/decoding conditions.

BACKGROUND ART

Image data is encoded by a codec conforming to a data compression standard, e.g., the Moving Picture Expert Group (MPEG) standard, and then is stored in a recording medium or transmitted through a communication channel in the form of a bitstream.

As hardware capable of reproducing and storing high-resolution or high-quality image content has been developed and become widely popular, a codec capable of efficiently encoding or decoding the high-resolution or high-quality image content is in high demand. The encoded image content may be reproduced by decoding it. Currently, methods of effectively compressing high-resolution or high-quality image content are used. For example, an image compression technique has been proposed to be effectively implemented by dividing an image to be encoded by an arbitrary method or manipulating data.

A transformation technique for frequency-transforming spatial-domain data into frequency-domain data is used as one of data manipulation techniques. In the compression standards, a fixed transform kernel is generally used because a transform kernel (a transform matrix) to be used for transformation and inverse transformation should be the same between an encoding process and a decoding process.

DESCRIPTION OF EMBODIMENTS

Technical Problem

Provided are a method and apparatus for performing transformation or inverse transformation on a current block by using a transform kernel corresponding to multi-core transformation by selecting a transform kernel, for transformation or inverse transformation on the current block, from among multi-core transformation according to a certain condition in video encoding and decoding processes.

Solution to Problem

According to one aspect of the present disclosure, a video decoding method includes obtaining multi-core transformation information from a bitstream, the multi-core transformation information indicating whether multi-core transform kernels are to be used to determine a transform kernel, for inverse transformation of a current block, according to a size of the current block; obtaining, from the bitstream, horizontal transform kernel information for determining a transform kernel for inverse transformation in a horizontal direction and vertical transform kernel information for determining a transform kernel for inverse transformation in a vertical direction, when the multi-core transform kernels are used to determine the transform kernel according to the multi-core transformation information; determining a horizontal transform kernel for inverse transformation of the current block in the horizontal direction according to the horizontal transform kernel information; determining a vertical transform kernel for inverse transformation of the current block in the vertical direction according to the vertical transform kernel information; and performing inverse transformation on the current block by using the horizontal transform kernel and the vertical transform kernel.

According to another aspect of the present disclosure, a video decoding apparatus includes a memory, and a processor connected to the memory, wherein the processor is configured to: obtain multi-core transformation information from a bitstream, the multi-core transformation information indicating whether multi-core transform kernels are to be used to determine a transform kernel for inverse transformation of a current block; obtain, from the bitstream, horizontal transform kernel information for determining a transform kernel for inverse transformation in a horizontal direction and vertical transform kernel information for determining a transform kernel for inverse transformation in a vertical direction, when the multi-core transform kernels are used to determine the transform kernel according to the multi-core transformation information; determine a horizontal transform kernel for inverse transformation of the current block in the horizontal direction according to the horizontal transform kernel information; determine a vertical transform kernel for inverse transformation of the current block in the vertical direction according to the vertical transform kernel information; and perform inverse transformation on the current block by using the horizontal transform kernel and the vertical transform kernel.

According to another aspect of the present disclosure, a video encoding method includes performing transformation on a current block by using multi-core transform kernels for determining a transform kernel for transformation of the current block; generating multi-core transform kernel information indicating whether multi-core transform kernels are used to determine the transform kernel; generating horizontal transform kernel information indicating a horizontal transform kernel used for transformation of the current block in a horizontal direction and vertical transform kernel information indicating a vertical transform kernel used for transformation of the current block in a vertical direction; and encoding a transform coefficient generated through transformation of the current block, the multi-core transformation information, the horizontal transform kernel information, and the vertical transform kernel information.

According to another aspect of the present disclosure, a video encoding apparatus includes a memory, and a processor connected to the memory, wherein the processor is configured to: perform transformation on a current block by using multi-core transform kernels for determining a transform kernel for transformation of the current block; generate multi-core transform kernel information indicating whether multi-core transform kernels are used to determine the transform kernel; generate horizontal transform kernel information indicating a horizontal transform kernel used for transformation of the current block in a horizontal direction and vertical transform kernel information indicating a vertical transform kernel used for transformation of the current block in a vertical direction; and encode a transform coefficient generated through transformation of the current block, the multi-core transformation information, the horizontal transform kernel information, and the vertical transform kernel information.

Advantageous Effects of Disclosure

In a video encoding or decoding process, a transform kernel for transformation and inverse transformation of a current block can be selected from among multi-core transformation according to a certain condition. Thus, energy compression performance according to transformation and inverse transformation of the current block may be enhanced using a transform kernel selected in consideration of a specific encoding or decoding condition.

BRIEF DESCRIPTION OF DRAWINGS

FIG. 5 illustrates a table of combinations of horizontal transform kernel candidates and vertical transform kernel candidates that change with an intra prediction mode.

FIG. 6 illustrates a table in which bits indicating transform kernel candidates of a block according to an intra prediction mode or an inter prediction mode are set, according to an embodiment.

FIG. 7 illustrates a table of transform basis functions for N inputs of DST7 and DCT8.

FIG. 18 illustrates a process of determining a depth of a coding unit as a shape and size of the coding unit change, when the coding unit is recursively split such that a plurality of coding units are determined, according to an embodiment.

BEST MODE

Figure 1:
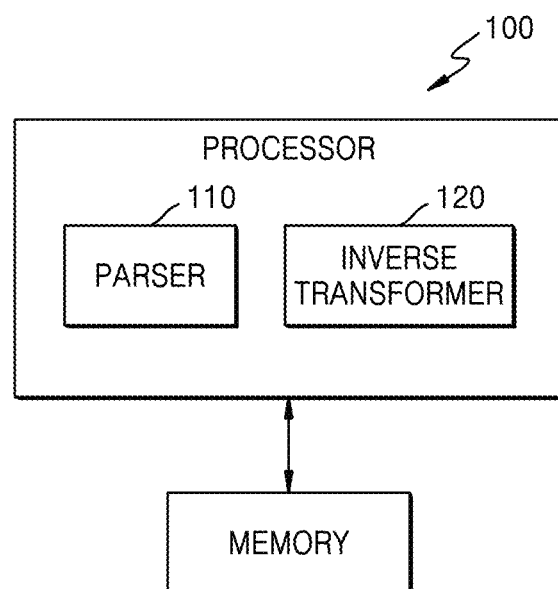
FIG. 1 is a block diagram of a video decoding apparatus according to an embodiment.

According to one aspect of the present disclosure, a video decoding method includes obtaining multi-core transformation information from a bitstream, the multi-core transformation information indicating whether multi-core transform kernels are to be used to determine a transform kernel, for inverse transformation of a current block, according to a size of the current block; obtaining, from the bitstream, horizontal transform kernel information for determining a transform kernel for inverse transformation in a horizontal direction and vertical transform kernel information for determining a transform kernel for inverse transformation in a vertical direction, when the multi-core transform kernels are used to determine the transform kernel according to the multi-core transformation information; determining a horizontal transform kernel for inverse transformation of the current block in the horizontal direction according to the horizontal transform kernel information; determining a vertical transform kernel for inverse transformation of the current block in the vertical direction according to the vertical transform kernel information; and performing inverse transformation on the current block by using the horizontal transform kernel and the vertical transform kernel.

In an embodiment, the multi-core transformation information may indicate that the multi-core transform kernels are used when the size of the current block is less than or equal to a certain size.

In an embodiment, the current block may be a luma block.

In an embodiment, the certain size may be 32×32 when the current block is the luma block.

In an embodiment, the current block may be a chroma block.

In an embodiment, the certain size may be 16×16 when the current block is the chroma block.

In an embodiment, when the current block is encoded in an intra prediction mode, the horizontal transform kernel and the vertical transform kernel may be respectively selected from transform kernel candidate sets DST7 and DCT8.

In an embodiment, when the current block is encoded in an inter prediction mode, the horizontal transform kernel and the vertical transform kernel may be respectively selected from transform kernel candidate sets DCT8 and DST7.

In an embodiment, the multi-core transformation information may depend on a depth of the current block and the number of significant coefficients of the current block.

According to another aspect of the present disclosure, a video decoding apparatus includes a memory, and a processor connected to the memory, wherein the processor is configured to: obtain multi-core transformation information from a bitstream, the multi-core transformation information indicating whether multi-core transform kernels are to be used to determine a transform kernel for inverse transformation of a current block; obtain, from the bitstream, horizontal transform kernel information for determining a transform kernel for inverse transformation in a horizontal direction and vertical transform kernel information for determining a transform kernel for inverse transformation in a vertical direction, when the multi-core transform kernels are used to determine the transform kernel according to the multi-core transformation information; determine a horizontal transform kernel for inverse transformation of the current block in the horizontal direction according to the horizontal transform kernel information; determine a vertical transform kernel for inverse transformation of the current block in the vertical direction according to the vertical transform kernel information; and perform inverse transformation on the current block by using the horizontal transform kernel and the vertical transform kernel.

According to another aspect of the present disclosure, a video encoding method includes performing transformation on a current block by using multi-core transform kernels for determining a transform kernel for transformation of the current block; generating multi-core transform kernel information indicating whether multi-core transform kernels are used to determine the transform kernel; generating horizontal transform kernel information indicating a horizontal transform kernel used for transformation of the current block in a horizontal direction and vertical transform kernel information indicating a vertical transform kernel used for transformation of the current block in a vertical direction; and encoding a transform coefficient generated through transformation of the current block, the multi-core transformation information, the horizontal transform kernel information, and the vertical transform kernel information.

According to another aspect of the present disclosure, a video encoding apparatus includes a memory, and a processor connected to the memory, wherein the processor is configured to: perform transformation on a current block by using multi-core transform kernels for determining a transform kernel for transformation of the current block; generate multi-core transform kernel information indicating whether multi-core transform kernels are used to determine the transform kernel; generate horizontal transform kernel information indicating a horizontal transform kernel used for transformation of the current block in a horizontal direction and vertical transform kernel information indicating a vertical transform kernel used for transformation of the current block in a vertical direction; and encode a transform coefficient generated through transformation of the current block, the multi-core transformation information, the horizontal transform kernel information, and the vertical transform kernel information.

Mode of Disclosure

Advantages and features of embodiments set forth herein and methods of achieving them will be apparent from the following description of embodiments in conjunction with the accompanying drawings. However, embodiments according to the present disclosure are not limited to the embodiments set forth herein and may be embodied in many different forms, and the present embodiments are merely provided so that the scope of embodiments will be completely understood by those of ordinary skill in the art.

The terms used herein will be briefly described and then embodiments set forth herein will be described in detail.

As used herein, general terms that have been widely used nowadays are selected, when possible, in consideration of functions of the embodiments set herein herein, but non-general terms may be selected according to the intentions of technicians in the this art, precedents, or new technologies, etc. Some terms may be arbitrarily chosen by the present applicant. In this case, the meanings of these terms will be explained in corresponding parts of the specification in detail. Thus, the terms used herein should be defined not based on the names thereof but based on the meanings thereof and the whole context of the specification.

As used herein, the singular forms "a", "an" and "the" are intended to include the plural forms as well, unless the context clearly indicates otherwise.

It will be understood that when an element is referred to as "including" another element, the element may further include other elements unless mentioned otherwise. The term "unit" used herein should be understood as software or a hardware component, such as a FPGA or an ASIC, which performs certain functions. However, the term "unit" is not limited to software or hardware. The term "unit" may be configured to be stored in an addressable storage medium or to reproduce one or more processors. Thus, the term "unit" may include, for example, components, such as software components, object-oriented software components, class components, and task components, processes, functions, attributes, procedures, subroutines, segments of program code, drivers, firmware, microcode, a circuit, data, database, data structures, tables, arrays, and parameters. Functions provided in components and "units" may be combined to a small number of components and "units" or may be divided into sub-components and "sub-units".

The term "image", when used herein, should be understood to include a static image such as a still image of a video, and a moving picture, i.e., a dynamic image, which is a video.

The term "sample", when used herein, refers to data allocated to a sampling position of an image, i.e., data to be processed. For example, samples may be pixel values in a spatial domain, and transform coefficients in a transform domain. A unit including at least one sample may be defined as a block.

Hereinafter, embodiments of the disclosure will be described in detail with reference to the accompanying drawings, so that the embodiments of the disclosure may be easily implemented by those of ordinary skill in the art. For clarity, parts irrelevant to a description of the present disclosure are omitted in the drawings.

A video encoding apparatus, a video decoding apparatus, a video encoding method, and a video decoding method according to embodiments will be described in detail with reference to FIGS. 1 to 21 below. In detail, a method and apparatus for performing transformation and inverse transformation on a block by using multi-core transform kernels according to a size of a current block according to an embodiment will be described with reference to FIGS. 1 to 7 below, and a method of determining a data unit of an image according to an embodiment will be described with reference to FIGS. 8 to 21 below.

A method and apparatus for encoding or decoding a video by performing transformation and/or inverse transformation according to an embodiment described herein will be described in detail with reference to FIGS. 1 to 7 below.

FIG. 1 is a block diagram of a video decoding apparatus 100 according to an embodiment.

The video decoding apparatus 100 according to an embodiment may include a parser 110 and an inverse transformer 120. In an embodiment, the parser 110 and the inverse transformer 120 may operate as separate processors or be operated by control of a central processor. Although not shown in FIG. 1, the video decoding apparatus 100 further includes a memory or storage for storing data received from the outside and data generated by the parser 110 and the inverse transformer 120.

The parser 110 may parse various syntaxes from a bitstream. Quantized transform coefficients of a block may be obtained from various syntaxes parsed by performing entropy decoding on the bitstream. The video decoding apparatus 100 may perform inverse quantization on the block by performing scaling on the quantized transform coefficients, based on a predetermined quantization parameter. Transform coefficients of the block may be obtained by inverse quantization.

In an embodiment, the video decoding apparatus 100 may reconstruct the block by decoding the bitstream. The video decoding apparatus 100 may obtain the transform coefficients of the block by decoding the bitstream.

In an embodiment, the inverse transformer 120 may obtain a residual sample of the block by performing inverse transform on the block. That is, the transform coefficients of the block may be inversely transformed by applying a transform kernel to the block, thereby reconstructing residual samples.

In an embodiment, while performing entropy decoding, the parser 110 may obtain multi-core transformation information from the bitstream to determine a transform kernel for inverse transformation of a current block according to a size of the current block, the multi-core transformation information indicating whether multi-core transform kernels are to be used.

In addition, the parser 110 may obtain, from the bitstream, horizontal transform kernel information for determining a transform kernel for inverse transformation in a horizontal direction and vertical transform kernel information for determining a transform kernel for inverse transformation in a vertical direction, when the multi-core transform kernels are used to determine the transform kernel according to the multi-core transformation information.

In an embodiment, the inverse transformer 120 may determine a horizontal transform kernel for inverse transformation of the current block in the horizontal direction according to the horizontal transform kernel information, determine a vertical transform kernel for inverse transformation of the current block in the vertical direction according to the vertical transform kernel information, and perform inverse transformation on the current block by using the horizontal transform kernel and the vertical transform kernel.

The video decoding apparatus 100 may generate spatial-domain reconstructed samples by combining a predicted sample of the current block generated by prediction and residual samples of the block generated by inverse transformation. In detail, reconstructed samples of the block may be generated by combining the predicted sample and the residual samples.

Operations of the video decoding apparatus 100 for performing multi-core transformation on the current block according to an embodiment will be described in detail with reference to FIG. 2 below.

Figure 2:
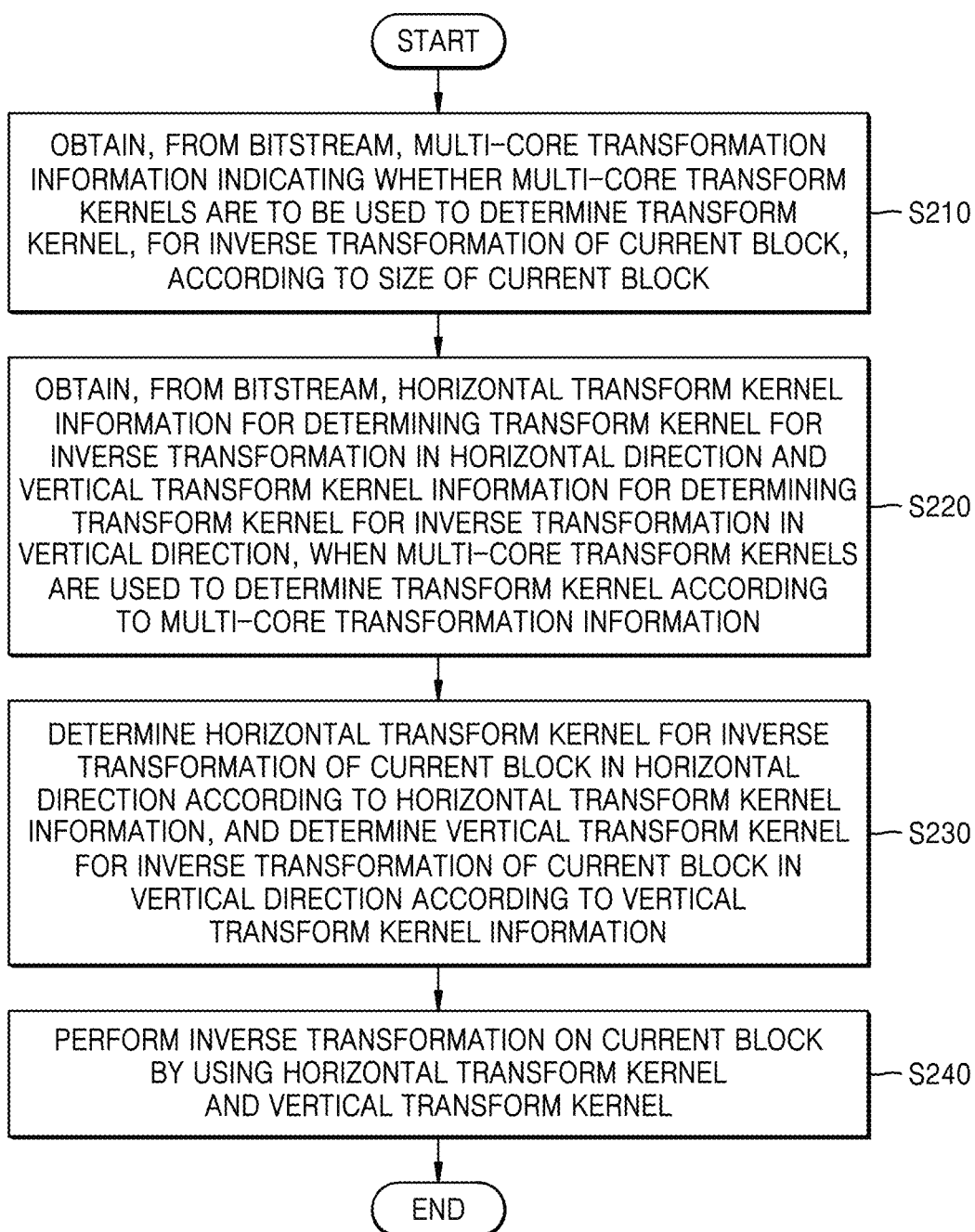
FIG. 2 is a flowchart of a video decoding method according to an embodiment.

FIG. 2 is a flowchart of a video decoding method according to an embodiment.

In operation S210, the video decoding apparatus 100 may obtain multi-core transformation information from a bitstream to determine a transform kernel for inverse transformation of a current block according to a size of the current block, the multi-core transformation information indicating whether multi-core transform kernels are to be used.

In an embodiment, the multi-core transformation information may indicate that the multi-core transform kernels are used when the size of the current block is less than or equal to a predetermined size.

In an embodiment, the multi-core transform kernels may be used for a luma block. When a multi-core transform kernel is used for the luma block, the predetermined size may be 32×32. Alternatively, the predetermined size may be a different size.

In an embodiment, the multi-core transform kernels may be used for a chroma block. When a multi-core transform kernel is used for the chroma block, the predetermined size may be 16×16. Alternatively, the predetermined size may be a different size.

In operation S220, when the multi-core transform kernels are used to determine the transform kernel based on the multi-core transformation information, the video decoding apparatus 100 may obtain, from the bitstream, horizontal transform kernel information for determining a transform kernel for inverse transformation in a horizontal direction and vertical transform kernel information for determining a transform kernel for inverse transformation in a vertical direction.

In operation S230, the video decoding apparatus 100 may determine a horizontal transform kernel for inverse transformation of the current block in the horizontal direction according to the horizontal transform kernel information, and a horizontal transform kernel for inverse transformation of the current block in the horizontal direction according to the horizontal transform kernel information.

In an embodiment, when a prediction mode of the current block is an intra prediction mode, a horizontal transform kernel candidate and a vertical transform kernel candidate may be changed according to an intra planar mode, an intra DC mode, or a prediction direction of an intra mode. Specific embodiments will be described in detail with reference to a table of FIG. 5 below.

In an embodiment, a transform kernel candidate set of a horizontal transform kernel and a vertical transform kernel may be set in advance according to the prediction mode.

For example, when the prediction mode of the current block is the intra prediction mode, a set 0: {DST7, DCT8}, a set 1: {DST7, DST1}, and a set 2: {DST7, DCT5} may be designated as a transform kernel candidate set of the current block. A first factor and a second factor of the transform kernel candidate set represent the horizontal transform kernel and the vertical transform kernel, respectively.

According to the table of FIG. 5, an index indicating a horizontal transform kernel candidate and an index indicating a vertical transform kernel candidate are paired with each other for each intra mode.

For example, when the prediction mode of the current block is the intra prediction mode and an intra mode index is 1, a horizontal transform kernel candidate index is 2 and a vertical transform kernel candidate index is also 2. Therefore, a DST7 type horizontal transform kernel which is a first factor of the set 2: {DST7, DCT5} indicated by the horizontal transform kernel candidate index may be selected as a horizontal transform kernel for inverse transformation of a current coding block. A DCT5 type vertical transform kernel which is a second factor of the set 2: {DST7, DCT5} indicated by the vertical transform kernel candidate index may be selected as a vertical transform kernel for inverse transformation of the current coding block.

For example, when the prediction mode of the current block is the intra prediction mode and the intra mode index is 9, the horizontal transform kernel candidate index is 2 and the vertical transform kernel candidate index is 0. Therefore, the DST7 type horizontal transform kernel which is the first factor of the set 2: {DST7, DCT5} indicated by the horizontal transform kernel candidate index may be selected as a horizontal transform kernel for inverse transformation of the current coding block. A DCT8 type vertical transform kernel which is a second factor of the set 0: {DST7, DCT8} indicated by the vertical transform kernel candidate index may be selected as a vertical transform kernel for inverse transformation of the current coding block.

In an embodiment, when the prediction mode of the current block is the intra prediction mode, a pair of a horizontal transform kernel and a vertical transform kernel may be considered as a transform kernel candidate set of the current block. For example, a set 0: {DST7, DST7}, a set 1: {DST7, DCT8}, a set 2: {DCT8, DST7}, and a set 3: {DCT8, DCT8} may be designated as a transform kernel candidate set.

In an embodiment, the video decoding apparatus 100 may use a multiple transformation technique as a technique for performing inverse transformation on a transform block by using a transform kernel selected from among various transform kernels. Various transform kernels that may be selected for the multiple transformation technique may be defined for each type. According to a certain video compression standard, transform kernels of each of transform kernel types are defined in advance. The transform kernel types are DCT1, DCT2, DCT3, . . . , DCT7, . . . , DCTn, DST1, DST2, DST3, . . . , DST7, . . . , DSTm (here, n and m each represents an integer). For each DCTn type and DSTm type, a horizontal transform kernel and a vertical transform kernel of a transform block are defined. Therefore, a DCT8 type horizontal transform kernel may be selected for horizontal inverse transformation of a block, and a DST7 type vertical transform kernel may be selected for vertical inverse transformation of the block. That is, the horizontal transform kernel and the vertical transform kernel may be selected separately.

In an embodiment, the multiple transformation technique may be used when a size of a luma block is greater than or equal to 4×4 or equal to or less than 32×32.

In an embodiment, the multiple transformation technique may be used when a size of a chroma block is greater than or equal to 4×4 or equal to or less than 16×16.

In an embodiment, the transform kernel candidate set may include 2n candidates (here, n represents a positive number).

In an embodiment, the transform kernel candidate set may be configured in a default mode. a transform kernel candidate set predetermined by information parsed at a slice level or in an encoder/decoder may be used.

In an embodiment, the transform kernel candidate set may be adaptively configured according to a mode in which the current block is encoded. For example, in the case of an intra mode 0, a set 0: {DST7, DST7}, a set 1: {DST7, DCT8}, a set 2: {DCT8, DST7}, and a set 3: {DCT8, DCT8} may be designated as a transform kernel candidate set, in the case of an intra mode 1, a set 0: {DCT2, DST7}, a set 1: {DCT2, DCT8}, a set 2: {DCT2, DST7}, and a set 3: {DCT2, DCT8} may be designated as a transform kernel candidate set, in the case of an inter affine prediction mode, a set 0: {DST7, DST7}, a set 1: {DST7, DCT8}, a set 2: {DCT8, DST7}, and a set 3: {DCT8, DCT8} may be designated as a transform kernel candidate set, and in the case of inter AMVP mode or an inter AMVR mode, a set 0: {DCT2, DST7}, a set 1: {DCT2, DCT8}, a set 2: {DCT2, DST7}, and a set 3: {DCT2, DCT8} may be designated as a transform kernel candidate set. A first factor and a second factor of the transform kernel candidate set respectively represent a horizontal transform kernel and a vertical transform kernel. The transform kernel candidates of the set 0 are selected when a 2-bit flag representing the horizontal and vertical transform kernels is 00, the transform kernel candidates of the set 1 are selected when the 2-bit flag representing the horizontal and vertical transform kernels is 01, the transform kernel candidates of the set 2 are selected when the 2-bit flag representing the horizontal and vertical transform kernels is 10, and the transform kernel candidates of the set 3 are selected when the 2-bit flag representing the horizontal and vertical transform kernels is 11.

In an embodiment, the transform kernel candidate set may be adaptively configured according to a shape of the current block. For example, in the case of an N×N block, a set 0: {DST7, DST7}, a set 1: {DST7, DCT8}, a set 2: {DCT8, DST7}, and a set 3: {DCT8, DCT8} may be designated as a transform kernel candidate set, in the case of an N×2N block, a set 0: {DCT2, DST7}, a set 1: {DCT2, DCT8}, a set 2: {DCT2, DST7}, and a set 3: {DCT2, DCT8} may be designated as a transform kernel candidate set, in the case of an N×4N block, a set 0: {DCT2, DST7}, a set 1: {DCT2, DCT8}, a set 2: {DCT2, DST7}, and a set 3: {DCT2, DCT8} may be designated as a transform kernel candidate set, in the case of a 2N×N block, a set 0: {DST7, DST7}, a set 1: {DST7, DCT8}, a set 2: {DCT8, DST7}, and a set 3: {DCT8, DCT8} may be designated as a transform kernel candidate set, and in the case of a 4N×N block, a set 0: {DST7, DST7}, a set 1: {DST7, DCT8}, a set 2: {DCT8, DST7}, and a set 3: {DCT8, DCT8} may be designated as a transform kernel candidate set.

In an embodiment, the transform kernel candidate set may be configured as one transform kernel adaptively according to the shape of the current block. For example, in the case of a 1×N block, a set 0: {DCT2, NON}, a set 1: {DCT2, NON}, a set 2: {DCT2, NON}, and a set 3: {DCT2, NON} may be designated as a transform kernel candidate set, and in the case of a N×1 block, a set 0: {NON, DCT2}, a set 1: {NON, DCT2}, a set 2: {NON, DCT2}, and a set3: {NON, DCT2} may be designated as a transform kernel candidate set.

In an embodiment, the transform kernel candidate set may be adaptively configured according to the size of the current block. For example, a set 0: {DST7, DST7}, a set 1: {DST7, DCT8}, a set 2: {DCT8, DST7}, and a set 3: {DCT8, DCT8} may be designated as a transform kernel candidate set when the width and height of a block are each 128, a set 0: {DCT2, DST7}, a set 1: {DCT2, DCT8}, a set 2: {DCT2, DST7}, and a set 3: {DCT2, DCT8} may be designated as a transform kernel candidate set when the width and height of the block are respectively greater than or equal to 32 and less than 128, and a set 0: {DCT2, DST7}, a set 1: {DCT2, DCT8}, a set 2: {DCT2, DST7}, and a set 3: {DCT2, DCT8} may be designated as a transform kernel candidate set when the width and height of the block are each less than 32.

In an embodiment, the transform kernel candidate set may be adaptively configured according to the width or height of the current block. For example, a set 0: {DST7, NON}, a set 1: {DST7, NON}, a set 2: {DCT8, NON}, and a set 3: {DCT8, NON} may be designated when the width of the current block is 128, a set 0: {DCT2, NON}, a set 1: {DCT2, NON}, a set 2: {DCT2, NON}, and a set 3: {DCT2, NON} may be designated when the width of the current block is greater than or equal to 32 and less than 128, and a set 0: {DCT5, NON}, a set 1: {DCT5, NON}, a set 2: {DCT5, NON}, and a set 3: {DCT5, NON} may be designated when the width of the current block is less than 32. A set 0: {NON, DST7}, a set 1: {NON, DST7}, a set 2: {NON, DCT8}, and a set 3: {NON, DCT8} may be designated when the height of the current block is 128, a set 0: {NON, DCT2}, a set 1: {NON, DCT2}, a set 2: {NON, DCT2}, and a set 3: {NON, DCT2} may be designated when the height of the current block is greater than or equal to 32 and less than 128, and a set 0: {NON, DCT5}, a set 1: {NON, DCT5}, a set 2: {NON, DCT5}, and a set 3: {NON, DCT5} may be designated when the height of the current block is less than 32.

In an embodiment, the transform kernel candidate set may be adaptively configured according to the width, height, or shape of the current block.

According to an embodiment, when the prediction mode of the current block is the intra prediction mode, each of the horizontal transform kernel and the vertical transform kernel may be selected from the transform kernel candidate sets DST7 and DCT8. When a flag indicating horizontal transform kernel information and vertical transform kernel information is 2 bits, {DST7, DST7} may be designated when the flag is 00, {DST7, DCT8} may be designated when the flag is 01, {DCT8, DST7} may be designated when the flag is 10, and {DCT8, DCT8} may be designated when the flag is 11.

In an embodiment, when the prediction mode of the current block is the inter prediction mode, each of the horizontal transform kernel and the vertical transform kernel may be selected from transform kernel candidate sets DCT8 and DST7. When the flag indicating the horizontal transform kernel information and the vertical transform kernel information is 2 bits, {DCT8, DCT8} may be designated when the flag is 00, {DCT8, DST7} may be designated when the flag is 01, {DST7, DCT8} may be designated when the flag is 10, and {DST7, DST7} may be designated when the flag is 11.

FIG. 6 illustrates a table in which bits indicating transform kernel candidates of a block according to an intra prediction mode or an inter prediction mode are set, according to an embodiment.

In detail, in the case of an intra block, DST7 may be designated as a transform kernel when a bit value is 0 and DCT8 may be designated as a transform kernel when the bit value is 1, and in the case of an inter block, DCT8 may be designated as a transform kernel when the bit value is 0 and DST7 may be designated as a transform kernel when a bit value is 1. In addition, the bit may be set for each of a horizontal transform kernel and a vertical transform kernel.

FIG. 7 illustrates a table of transform basis functions for N point inputs of DST7 and DCT8.

In an embodiment, a transform kernel candidate set may be variably configured according to at least one of whether a specific tool is on or off, the number of significant coefficients, the sum of squares of the significant coefficients, a depth, or a quantization parameter.

In operation S240, the video decoding apparatus 100 may perform inverse transformation on the current block by using the horizontal transform kernel and the vertical transform kernel.

In detail, inverse transformation may be performed on the current block by performing horizontal transformation on the current block by using the horizontal transform kernel and applying the vertical transform kernel to the horizontally transformed current block. Thus, residual samples of a transform coefficient of the current block may be generated. The horizontal transform kernel and the vertical transform kernel may be applied in reverse order.

In an embodiment, multi-core transformation information may be individually set for each data unit, e.g., a block such as a sequence, a picture, a slice, or a coding unit.

To this end, in an embodiment, the video decoding apparatus 100 may obtain multi-core transformation information of a sequence level from a bitstream, and indicate whether multi-core transform kernels are to be used to determine the transform kernel within a current sequence, based on the multi-core transformation information of the sequence level. In a concrete embodiment, the video decoding apparatus 100 may parse the multi-core transformation information from a sequence parameter set (SPS) of the current sequence, and determine whether a transform kernel for inverse transformation of the current sequence is to be set as a multi-core transform kernel according to the multi-core transformation information.

In an embodiment, the video decoding apparatus 100 may obtain multi-core transformation information of a picture level from the bitstream, and indicate whether multi-core transform kernels are to be used to determine the transform kernel within a current picture, based on the multi-core transformation information of the picture level. In a concrete embodiment, the video decoding apparatus 100 may parse the multi-core transformation information from a picture parameter set (PPS) of the current picture, and determine whether a transform kernel for inverse transformation of the current sequence is to be set as a multi-core transform kernel according to the multi-core transformation information.

In an embodiment, the video decoding apparatus 100 may obtain multi-core transformation information of a slice level from the bitstream, and indicate whether multi-core transform kernels are to be used to determine the transform kernel within a current slice, based on the multi-core transformation information of the slice level. In a concrete embodiment, the video decoding apparatus 100 may parse the multi-core transformation information from a slice header of the current slice, and determine whether a transform kernel for inverse transformation of the current slice is to be set as a multi-core transform kernel according to the multi-core transformation information.

In an embodiment, the video decoding apparatus 100 may obtain multi-core transformation information of a coding unit level from the bitstream, and indicate whether multi-core transform kernels are to be used to determine the transform kernel within a current coding unit, based on the multi-core transformation information of the coding unit level. In a concrete embodiment, the video decoding apparatus 100 may parse the multi-core transformation information from coding unit syntax of the current coding unit, and determine whether a transform kernel for inverse transformation of the current coding unit is to be set as a multi-core transform kernel according to the multi-core transformation information.

Accordingly, in an embodiment, the video decoding apparatus 100 may parse the multi-core transformation information from at least one of the coding unit syntax, the slice header, the PPS, or the SPS, and identify whether the multi-core transform kernel is used as a transform kernel for each data unit such as a sequence, a picture, a slice or a coding unit according to a parsing position of the multi-core transformation information.

Figure 3:
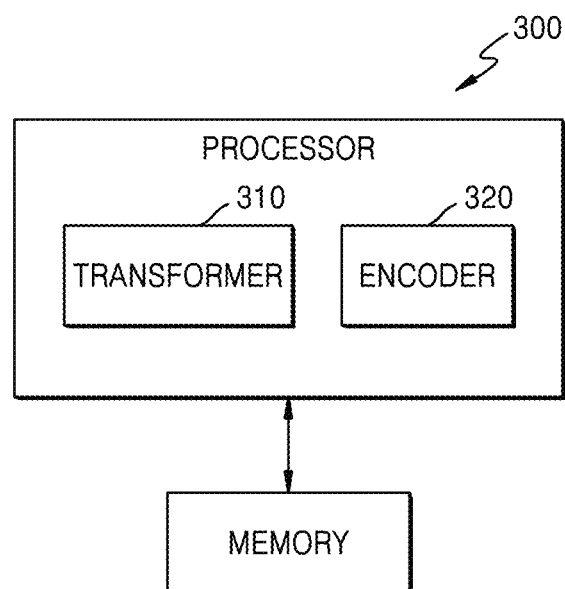
FIG. 3 is a block diagram of a video encoding apparatus according to an embodiment.

FIG. 3 is a block diagram of a video decoding apparatus 300 according to an embodiment.

In an embodiment, the video encoding apparatus 300 may include a transformer 310 and an encoder 320. In an embodiment, the transformer 310 and the encoder 320 may operate as separate processors or be operated by control of a central processor. Although not shown in FIG. 1, the video encoding apparatus 300 further includes a memory or storage to store input video data and data generated by the transformer 310 an the encoder 320.

In an embodiment, the video encoding apparatus 300 may split a picture into a plurality of blocks to encode video data. The sizes of the blocks may vary, and the blocks will be hereinafter referred to as coding units. In an embodiment, a size of a coding unit may be gradually changed according to a hierarchical structure, a sub-block may be determined from the coding unit to perform transformation on the coding unit, and a sub-block for prediction of the coding unit may also be determined. Even a sub-block for transformation and a sub-block for prediction are split from one coding unit, the sizes thereof be determined individually.

The video encoding apparatus 300 may perform prediction on each coding unit to determine prediction samples, based on a prediction block. When prediction is performed in an intra prediction mode, prediction samples may be determined using sample values of neighboring blocks spatially adjacent to the prediction block. When prediction is performed in an inter prediction mode, prediction samples may be determined using samples of a block located at a position temporally corresponding to a prediction block of a current picture within a reference picture.

The video encoding apparatus 300 may generate a residual sample by subtracting the prediction samples from samples of respective coding blocks. The video encoding apparatus 300 may generate a quantized transform coefficient by performing transformation and quantization on the residual samples, based on a transform block of each coding block.

The video encoding apparatus 300 generates a quantized transform coefficient by performing transformation and quantization on residual samples generated through prediction of a coding block, and reconstructs the residual samples by performing inverse quantization and inverse transformation. The reconstructed residual samples and the prediction samples may be added, and finally, reconstructed samples of the coding unit may be stored. The stored reconstructed samples may be used as reference samples for prediction of another coding unit.

In an embodiment, the video encoding apparatus 300 may encode blocks of video data. Accordingly, the video encoding apparatus 300 may generate transform coefficients by performing transformation on a block.

In an embodiment, the transformer 310 may obtain a transform coefficient of a residual sample of a current block by performing transformation on the current block. That is, residual samples of a block may be transformed by applying a transform kernel to the current block and thus transform coefficients may be generated.

In an embodiment, the video encoding apparatus 300 may use multi-core transform kernels as a transform kernel.

The encoder 320 may generate a bin string by binarizing multi-core transformation information indicating whether the multi-core transform kernels are to be used to determine a transform kernel for inverse transformation of the current block according to a size of the current block, and output a bit string generated by performing entropy encoding on the bin string of multi-core transformation information.

When the transformer 310 uses a multi-core transform kernel to determine the transform kernel for transformation of the current block, the encoder 320 may generate horizontal transform kernel information representing a horizontal transform kernel used for transformation of the current block in the horizontal direction and vertical transform kernel information representing a vertical transform kernel used for transformation of the current block in the vertical direction.

In a concrete embodiment, the multi-core transformation information may be represented by a value of 0 or 1, and may be set to 0 when the multi-core transformation is not used as the transform kernel and be set to 1 when the multi-core transformation is used as the transform kernel.

In an embodiment, the encoder 320 may output bit strings generated by entropy encoding the multi-core transformation information, the horizontal transform kernel information, the vertical transform kernel information, and the quantized transform coefficient of the current block.

Operations of the video encoding apparatus 300 for performing multiple transformation on a current block according to an embodiment will be described in detail with reference to FIG. 4 below.

Figure 4:
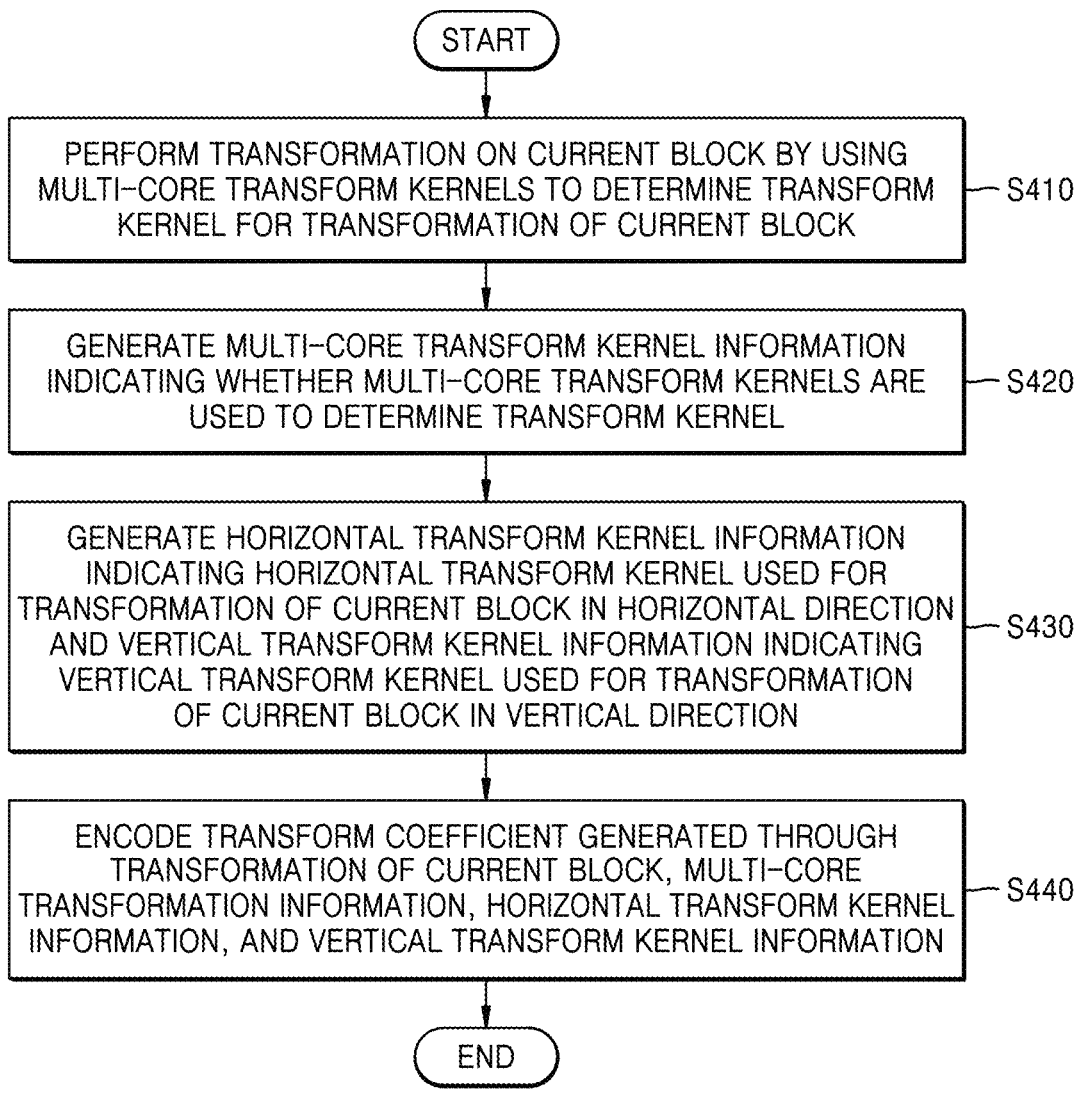
FIG. 4 is a flowchart of a video encoding method according to an embodiment.

FIG. 4 is a flowchart of a video encoding method according to an embodiment.

In operation S410, the video encoding apparatus 300 may perform transformation on a current block by using multi-core transform kernels to determine a transform kernel for transformation of the current block.

In operation S420, the video encoding apparatus 300 may generate multi-core transform kernel information indicating whether multi-core transform kernels are used to determine the transform kernel.

In operation S430, the video encoding apparatus 300 may generate horizontal transform kernel information representing a horizontal transform kernel for transformation of the current block in the horizontal direction and vertical transform kernel information representing a vertical transform kernel for transformation of the current block in the vertical direction.

In operation S440, the video encoding apparatus 300 may encode and output a transform coefficient generated by performing transformation on the current block, the multi-core transformation information, the horizontal transform kernel information, and the vertical transform kernel information.

The video encoding apparatus 300 may select the horizontal transform kernel and the vertical transform kernel for the current block from a transform kernel candidate set according to a prediction mode.

In an embodiment, the multi-core transformation information may be individually set for each data unit, e.g., a block such as a sequence, a picture, a slice, or a coding unit.

For example, in an embodiment, the video encoding apparatus 300 may determine a transform kernel by using multi-core transform kernels to transform a current coding unit. In this case, multi-core transform information indicating whether the multi-core transform kernels are used for the transform kernel may be encoded at a coding unit level. The multi-core transformation information may be included in coding unit syntax for a current coding unit.

For example, in an embodiment, the video encoding apparatus 300 may determine the transform kernel by using the multi-core transform kernels to transform a current slice. In this case, the multi-core transformation information indicating whether the multi-core transform kernels are used for the transform kernel may be encoded at a slice level. The multi-core transformation information may be included in a slice header for the current slice.

For example, in an embodiment, the video encoding apparatus 300 may determine the transform kernel by using the multi-core transform kernels to transform a current picture. In this case, the multi-core transformation information indicating whether the multi-core transform kernels are used for the transform kernel may be encoded at a picture level. The multi-core transformation information may be included in a picture parameter set (PPS) for the current picture.

For example, in an embodiment, the video encoding apparatus 300 may determine the transform kernel by using the multi-core transform kernels to transform a current sequence. In this case, the multi-core transformation information indicating whether the multi-core transform kernels are used for the transform kernel may be encoded at a sequence level. The multi-core transformation information may be included in a sequence parameter set (SPS) for the current sequence.

Accordingly, in an embodiment, the video encoding apparatus 300 may include the multi-core transformation information in at least one of the coding unit syntax, the slice header, the PPS, or the SPS according to whether the transform kernel is determined using the multi-core transform kernels for each data unit such as a sequence, a picture, a slice, or a coding unit.

A signaling method according to a decoding method of the present disclosure will be described in detail below.

In an embodiment, whether multi-core transformation information is to be obtained may be determined according to a size of a current block. In detail, multi-core transformation information may be obtained when a size of the current block is less than or equal to a predetermined size, and may not be obtained and a DCT2 type transform kernel may be fixedly used as a transform kernel for inverse transformation of the current block when the size of the current block is greater than the predetermined size.

In an embodiment, whether multi-core transformations are to be used may be signaled by setting a 1-bit flag when the multi-core transformation information is obtained.

As a concrete specific example, the multi-core transform kernels may not be used when a value of the multi-core transformation information, which is the 1-bit flag, is 0, and may be used when the value of the multi-core transformation information is 1.

In an embodiment, when the multi-core transformation information is used, i.e., when the 1-bit flag representing the multi-core transformation information is 1, additional N bits may be set to represent transform kernels to be selected as a horizontal transform kernel and a vertical transform kernel. For example, when multi-core transformation is used, a value representing the horizontal transform kernel and the vertical transform kernel may be set to 2 bits.

In an embodiment, the additional N bits may be variably set according to at least one of a width, a height, a shape, an intra prediction mode, an inter prediction mode, or a depth of a block. For example, in the case of a 64×64 block, 1 bit may be used as an on/off flag indicating whether multi-core transformation is to be used and 2 bits may be used as information indicating a mode. In the case of a 64×16 block, 1 bit may be used as the on/off flag indicating whether multi-core transformation is to be used and 1 bit may be used the information indicating the mode.

In an embodiment, the 1-bit on/off flag indicating whether multi-core transformation is to be used may be variably signaled according to at least one of a width, height, or shape of a block, an intra prediction mode, an inter prediction mode, whether a specific tool is on or off, the number of significant coefficients (non-zero coefficients), the sum of squares of the effective coefficients, a depth, or a quantization parameter. For example, the 1-bit on/off flag may not be signaled when MPI and PDPC tools are on or when the sum of the squares of the significant coefficients is greater or less than a predetermined threshold, and may be signaled in units of slices or pictures of the predetermined threshold. The predetermined threshold may be variably set according to at least one of the number of significant coefficients, the sum of the squares of the significant coefficient squares, the depth, or the quantization parameter. In the case of a 128×128 block, the flag indicating whether multi-core transformation is to be used may not be signaled and multi-core transformation may not be applied.

In an embodiment, a mode flag indicating a mode may be variably signaled according to at least one of a width, height, or shape of a block, an intra prediction mode, an inter prediction mode, whether a specific tool is to be used, the number of significant coefficients, or a depth.

In an embodiment, a default mode may be set when the mode flag is not signaled and a multi-core transform flag is signaled and thus is on. For example, when the MPI and PDPC tools are on and thus the mode flag is not signaled, the default mode may be set when the multi-core transform flag is signaled and thus is on. When the number of significant coefficient is greater or less than the predetermined threshold and thus the mode flag is not signaled, the default mode may be set when the multi-core transformation flag is signaled and thus is on. The default mode may be determined in advance by an encoder/decoder or a mode transmitted at a slice level may be set as the default mode.

In an embodiment, when the multi-core transform flag is on and additional N bits are signaled for mode designation, a CABAC method using a context model, a fixed-length method, or a unary method may be used as a signaling method. In detail, after the on/off 1-bit flag indicating whether to use multi-core transformation is binarized, the CABAC method may be used, four modes may be expressed as {0, 10, 110, 111} by the unary method, and then the CABAC method may be used. Alternatively, the multi-core transform flag may be set to 1 bit, and the four modes may be represented as {00, 01, 10, 11} by the fixed length method or represented as {0, 10, 110, 111} by the unary method.

In an embodiment, when a 1-bit flag of multi-core transformation using the CABAC method is on, for signaling additional N bits for mode designation, a context modeling method may be configured based on multi-core transformation flag and a mode flag of neighboring blocks (e.g., a left block, an upper right block, an upper left block, a lower left block, and a co-located block located at the same position in an inter mode). The context modeling method may be variably configured according to at least one of a width, height, or shape of a block, an intra prediction mode, an inter prediction mode, whether a specific tool is to be used, the number of significant coefficients, or a depth. For example, context modeling may be configured and signaled according to the depth of the block and the number of significant coefficients.

In an embodiment, when multi-core transformation is applied to encoding or decoding, a region to which multi-core transformation is applied may be variably configured according to at least one of a width, height, or shape of a block, an intra prediction mode, an inter prediction mode, whether a specific tool is to be used, the number of significant coefficients, the sum of squares of the significant coefficients, a depth, or a quantization parameter. For example, in the case of a 128×128 block, only an upper left 64×64 region may be designated as a region to be transformed and the other regions may be filled with 0. The 128×128 block may be split into four 64×64 regions and transformation may be performed four times on the 64×64 regions. In the case of a 128×64 block, only an upper left 64×64 region may be designated as a region to be transformed and the other regions may be filled with 0. The 128×64 block may be split into two 64×64 regions and transformation may be performed twice on the 64×64 regions.

In the operations performed by the video decoding apparatus 100 and the operations performed by the video encoding apparatus 200 described above with reference to FIGS. 1 to 7, each block may be a data unit such as a coding unit, a sub-block of the coding unit, or a largest coding unit. For example, the sub-block may be a prediction unit which is a block determined by splitting a coding unit to perform prediction on the coding unit, a transformation unit determined by splitting the coding unit to perform transformation and quantization on the coding unit, or the like.

Splitting a coding unit according to an embodiment of the present disclosure will be described in detail below.

An image may be split into largest coding units. A size of the largest coding unit may be determined based on information obtained from a bitstream. The largest coding unit may include squares of the same size. However, embodiments are not limited thereto. Alternatively, the largest coding unit may be hierarchically split into coding units, based on information regarding a split type mode obtained from the bitstream. The information regarding the split type mode may include at least one of information indicating whether splitting is to be performed, split direction information, or split type information. The information indicating whether splitting is to be performed indicates whether a coding unit is to be split. The split direction information indicates splitting performed in a horizontal direction or a vertical direction. The split type information indicates that the coding unit is to be split by one of binary splitting, tri-splitting, or quad splitting.

For example, information regarding the split type mode split_mode may indicate that a current coding unit is not to be split (NO_SPLIT). Alternatively, the information regarding the split type mode may indicate quad split QUAD_SPLIT. Alternatively, the information regarding the split type mode may indicate binary vertical split BI_VER_SPLIT. Alternatively, the information regarding the split type mode may indicate binary vertical split BI_VER_SPLIT. Alternatively, the information about the split type mode may indicate binary horizontal split BI_HOR_SPLIT. Alternatively, the information regarding the split type mode may indicate vertical tri-split TRI_VER_SPLIT. Alternatively, the information regarding the split type mode may indicate horizontal tri-split TRI_HOR_SPLIT.

The video decoding apparatus 100 may obtain the information regarding the split type mode from the bitstream from one bin string. A form of the bitstream received by the video decoding apparatus 100 may include fixed-length binary code, unary code, truncated unary code, a predetermined binary code, or the like. The bin string is a binary representation of information. The bin string may consist of at least one bit. The video decoding apparatus 100 may obtain the information regarding the split type mode corresponding to the bin string, based on a split rule. The video decoding apparatus 100 may determine whether to split a coding unit, a split direction, and a split type, based on one bin string.

The coding unit may be smaller than or equal to a largest coding unit. For example, when the information regarding the split type mode indicates no splitting, the coding unit has the same size as the largest coding unit. When the information regarding the split type mode indicates splitting, the largest coding unit may be split into coding units. When information regarding a split type mode for a coding unit indicates splitting, the coding units may be split into coding units having a smaller size. However, splitting an image is not limited thereto and a largest coding unit and a coding unit may not be distinguished from each other. Splitting a coding unit will be described in more detail with reference to FIGS. 8 to 21 below.

Alternatively, a coding unit may be split into a prediction unit for prediction of an image. The prediction unit may be equal to or smaller in size than the coding unit. Alternatively, the coding unit may be split into a transformation unit for transformation of the image. The transformation unit may be equal to or smaller in size than the coding unit. A shape and size of the transformation unit may not be related to those of the prediction unit. The coding unit may be distinguished from the prediction unit and the transformation unit but may be the same as the prediction unit and the transformation unit. The prediction unit and the transformation unit may be split in the same manner as the coding unit. Splitting a coding unit will be described in more detail with reference to FIGS. 8 to 21 below. As used herein, a current block and a neighboring block may each represent one of a largest coding unit, a coding unit, a prediction unit, and a transformation unit. In addition, the current block or a current coding unit is a block that is currently being decoded or encoded or a block that is currently being split. The neighboring block may be a block reconstructed prior to the current block. The neighboring blocks may be spatially or temporally adjacent to the current block. The neighboring block may be located at a lower left side, a left side, an upper left side, an upper side, an upper right side, a right side, or a lower side of the current block.

Figure 8:
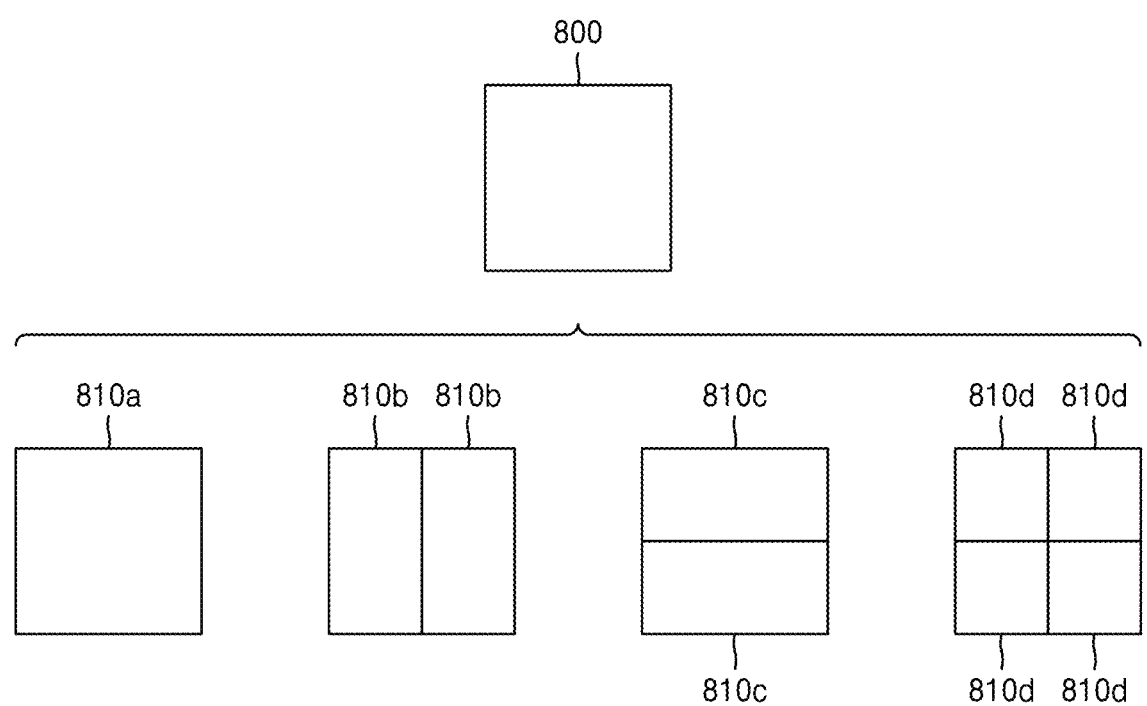
FIG. 8 illustrates a process of determining, by a video decoding apparatus, at least one coding unit by splitting a current coding unit, according to an embodiment.

FIG. 8 illustrates a process of determining at least one coding unit by splitting a current coding unit by the mage decoding apparatus 100, according to an embodiment.

A shape of a block may include 4N×4N, 4N×2N, 2N×4N, 4N×N or N×4N. Here, N may be a positive integer. Block shape information is information representing at least one of a shape, orientation, ratio between width and height, or size of a coding unit.

A shape of the coding unit may include a square shape and a non-square shape. When the width and height of the coding unit are the same (i.e., when a block shape of the coding unit is 4N×4N), the video decoding apparatus 100 may determine block shape information of the coding unit to be a square. The video decoding apparatus 100 may determine the shape of the coding unit to be a non-square.

When the width and height of the coding unit are different from each other (i.e., when the block shape of the coding unit is 4N×2N, 2N×4N, 4N×N, or N×4N), the video decoding apparatus 100 may determine a non-square as the block shape information of the coding unit. When the coding unit has a non-square shape, the video decoding apparatus 100 may determine the ratio between the width and height of the block shape information of the coding unit to at least one of 1:2, 2:1, 1:4, 4:1, 1:8, or 8:1. The video decoding apparatus 100 may determine whether the coding unit is oriented in the horizontal direction or the vertical direction, based on the width and height of the coding unit. The video decoding apparatus 100 may identify the size of the coding unit, based on at least one of the width, height, or area of the coding unit.

According to an embodiment, the video decoding apparatus 100 may determine a shape of a coding unit by using block shape information, and may determine a splitting method of the coding unit by using the information regarding the split type mode. That is, a coding unit splitting method indicated by the information regarding the split type mode may be determined based on a block shape indicated by the block shape information used by the video decoding apparatus 100.

The video decoding apparatus 100 may obtain the information regarding the split type mode from the bitstream. However, the present disclosure is not limited thereto, and the video decoding apparatus 100 and the video encoding apparatus 300 may determine information regarding a predetermined split type mode, based on the block shape information. The video decoding apparatus 100 may determine information regarding a predetermined split type mode for a largest coding unit or a smallest coding unit. For example, the video decoding apparatus 100 may determine 'quad splitting' as the information regarding the split type mode for the largest coding unit. Alternatively, the video decoding apparatus 100 may determine "no split" as the information regarding the split type mode for the smallest coding unit. In detail, the video decoding apparatus 100 may determine the size of the largest coding unit to be 256×256. The video decoding apparatus 100 may determine 'quad splitting' as the information regarding the predetermined split type mode. Quad split refers to a split type mode in which both the width and height of a coding unit are bitsected. The video decoding apparatus 100 may obtain a 128×128 coding unit from a 256×256 largest coding unit, based on the information regarding the split type mode. Alternatively, the video decoding apparatus 100 may determine the size of the smallest coding unit to be 4×4. The video decoding apparatus 100 may obtain the information regarding the split type mode indicating "no split" with respect to the smallest coding unit.

According to an embodiment, the video decoding apparatus 100 may use the block shape information indicating that the current coding unit has a square shape. For example, the video decoding apparatus 100 may determine whether not to split a square coding unit, whether to vertically split the square coding unit, whether to horizontally split the square coding unit, or whether to split the square coding unit into four coding units, based on the information regarding the split type mode. Referring to FIG. 8, when the block shape information of a current coding unit 800 indicates a square shape, a decoder may determine that a coding unit 88*a* having the same size as the current coding unit 800 is not split, based on the information regarding the split type mode indicating not to perform splitting, or may determine coding units 810*b*, 810*c*, or 810*d* split based on the information regarding the split type mode indicating a predetermined splitting method.

Referring to FIG. 8, according to an embodiment, the video decoding apparatus 100 may determine two coding units 810*b* obtained by splitting the current coding unit 800 in a vertical direction, based on the information regarding the split type mode indicating to perform splitting in a vertical direction. The video decoding apparatus 100 may determine two coding units 810*c* obtained by splitting the current coding unit 800 in a horizontal direction, based on the information regarding the split type mode indicating to perform splitting in a horizontal direction. The video decoding apparatus 100 may determine four coding units 810*d* obtained by splitting the current coding unit 800 in vertical and horizontal directions, based on the information regarding the split type mode indicating to perform splitting in vertical and horizontal directions. However, splitting methods of the square coding unit are not limited to the above-described methods, and the information regarding the split type mode may indicate various methods. Predetermined splitting methods of splitting the square coding unit will be described in detail below in relation to various embodiments.

Figure 9:
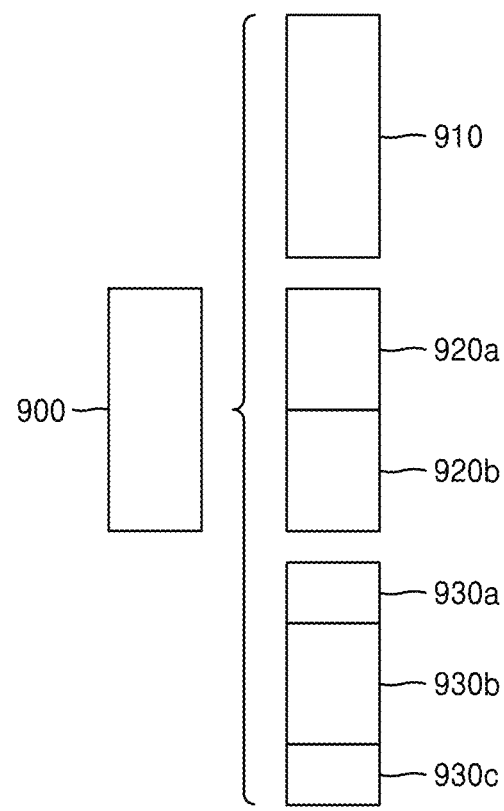
FIG. 9 illustrates a process of determining, by a video decoding apparatus, at least one coding unit by splitting a non-square coding unit, according to an embodiment.
Figure 9:
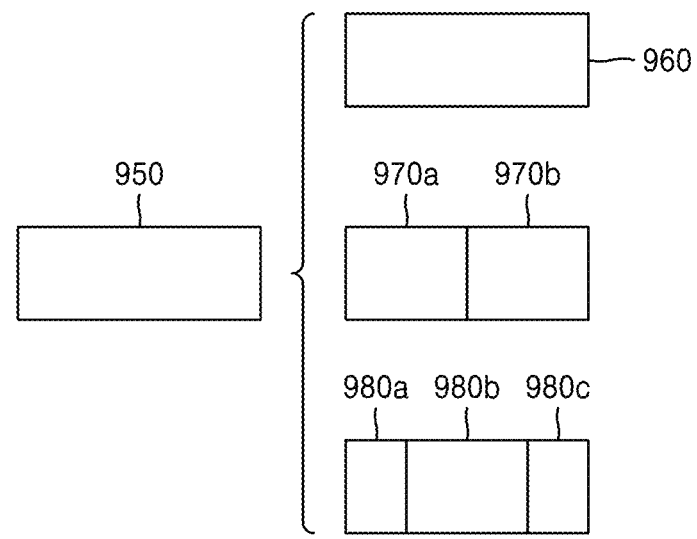

FIG. 9 illustrates a process, performed by the video decoding apparatus 100, of determining at least one coding unit by splitting a non-square coding unit, according to an embodiment.

According to an embodiment, the video decoding apparatus 100 may use block shape information indicating that a current coding unit has a non-square shape. The video decoding apparatus 100 may determine whether not to split the non-square current coding unit or whether to split the non-square current coding unit by using a predetermined splitting method, based on information regarding the split type mode. Referring to FIG. 9, when the block shape information of a current coding unit 900 or 950 indicates a non-square shape, the video decoding apparatus 100 may determine that a coding unit 910 or 960 having the same size as the current coding unit 900 or 950 is not split, based on the information regarding the split type mode indicating not to perform splitting, or may determine coding units 920*a* and 920*b*, 930*a* to 930*c*, 970*a* and 970*b*, or 980*a* to 980*c* split based on the information regarding the split type mode indicating a predetermined splitting method. Predetermined splitting methods of splitting a non-square coding unit will be described in detail below in relation to various embodiments.

According to an embodiment, the video decoding apparatus 100 may determine a splitting method of a coding unit by using the information regarding the split type mode and, in this case, the information regarding the split type mode may indicate the number of one or more coding units generated by splitting a coding unit. Referring to FIG. 9, when the information regarding the split type mode indicates to split the current coding unit 900 or 950 into two coding units, the video decoding apparatus 100 may determine two coding units 920*a* and 920*b*, or 970*a* and 970*b* included in the current coding unit 900 or 950, by splitting the current coding unit 900 or 950 based on the information regarding the split type mode.

According to an embodiment, when the video decoding apparatus 100 splits the non-square current coding unit 900 or 950 based on the information regarding the split type mode, the video decoding apparatus 100 may split the current coding unit, in consideration of the location of a long side of the non-square current coding unit 900 or 950. For example, the video decoding apparatus 100 may determine a plurality of coding units by dividing a long side of the current coding unit 900 or 950, in consideration of the shape of the current coding unit 900 or 950.

In an embodiment, when the information regarding the split type mode indicates splitting (tri-splitting) a coding unit into an odd number of blocks, the video decoding apparatus 100 may determine an odd number of coding units included in the current coding unit 900 or 950. For example, when the information about the split type mode indicates that the current coding unit 900 or 950 is to be split into three coding units, the video decoding apparatus 100 may split the current coding unit 900 or 950 into three coding units 930a, 930b, and 930c or 980a, 980b, and 980c.

In an embodiment, a ratio between the width and height of the current coding unit 900 or 950 may be 4:1 or 1:4. When the ratio between the width and height is 4:1, the width is longer than the height and thus the block shape information may indicate the horizontal direction. When the ratio between the width and height is 1:4, the width is shorter than the height and thus the block shape information may indicate the vertical direction. The video decoding apparatus 100 may determine that a current coding unit is to be split into an odd number of blocks, based on the information regarding the split type mode. In addition, the video decoding apparatus 100 may determine a direction of splitting the current coding unit 900 or 950, based on the block shape information of the current coding unit 900 or 950. For example, when the current coding unit 900 is oriented in the vertical direction, the video decoding apparatus 100 may determine the coding units 930a, 930b, and 930c by splitting the current coding unit 900 in the horizontal direction. When the current coding unit 950 is oriented in the horizontal direction, the video decoding apparatus 100 may determine the coding units 980a, 980b, and 980c by splitting the current coding unit 950 in the vertical direction.

In an embodiment, the video decoding apparatus 100 may determine an odd number of coding units included in the current coding unit 900 or 950, and not all the determined coding units may have the same size. For example, the size of the coding unit 930b or 980b among the determined odd number of coding units 930a, 930b, 930c, 980a, 980b, and 980c may be different from those of the other coding units 930a, 930c, 980a, and 980c. That is, coding units that may be determined by splitting the current coding unit 900 or 950 may have a plurality of different sizes, and in some cases, the sizes of the odd number of coding units 930a, 930b, 930c, 980a, 980b, and 980c may be different from one another.

According to an embodiment, when the information regarding the split type mode indicates to split a coding unit into an odd number of blocks, the video decoding apparatus 100 may determine an odd number of coding units included in the current coding unit 900 or 950, and may put a predetermined restriction on at least one coding unit from among the odd number of coding units generated by splitting the current coding unit 900 or 950. Referring to FIG. 9, the video decoding apparatus 100 may allow a decoding method of the coding unit 930b or 980b to be different from that of the other coding units 930a and 930c, or 980a and 980c, wherein the coding unit 930b or 980b is at a center location from among the three coding units 930a, 930b, and 930c, or 980a, 980b, and 980c generated by splitting the current coding unit 900 or 950. For example, the video decoding apparatus 100 may restrict the coding unit 930b or 980b at the center location to be no longer split or to be split only a predetermined number of times, unlike the other coding units 930a and 930c, or 980a and 980c.

Figure 10:
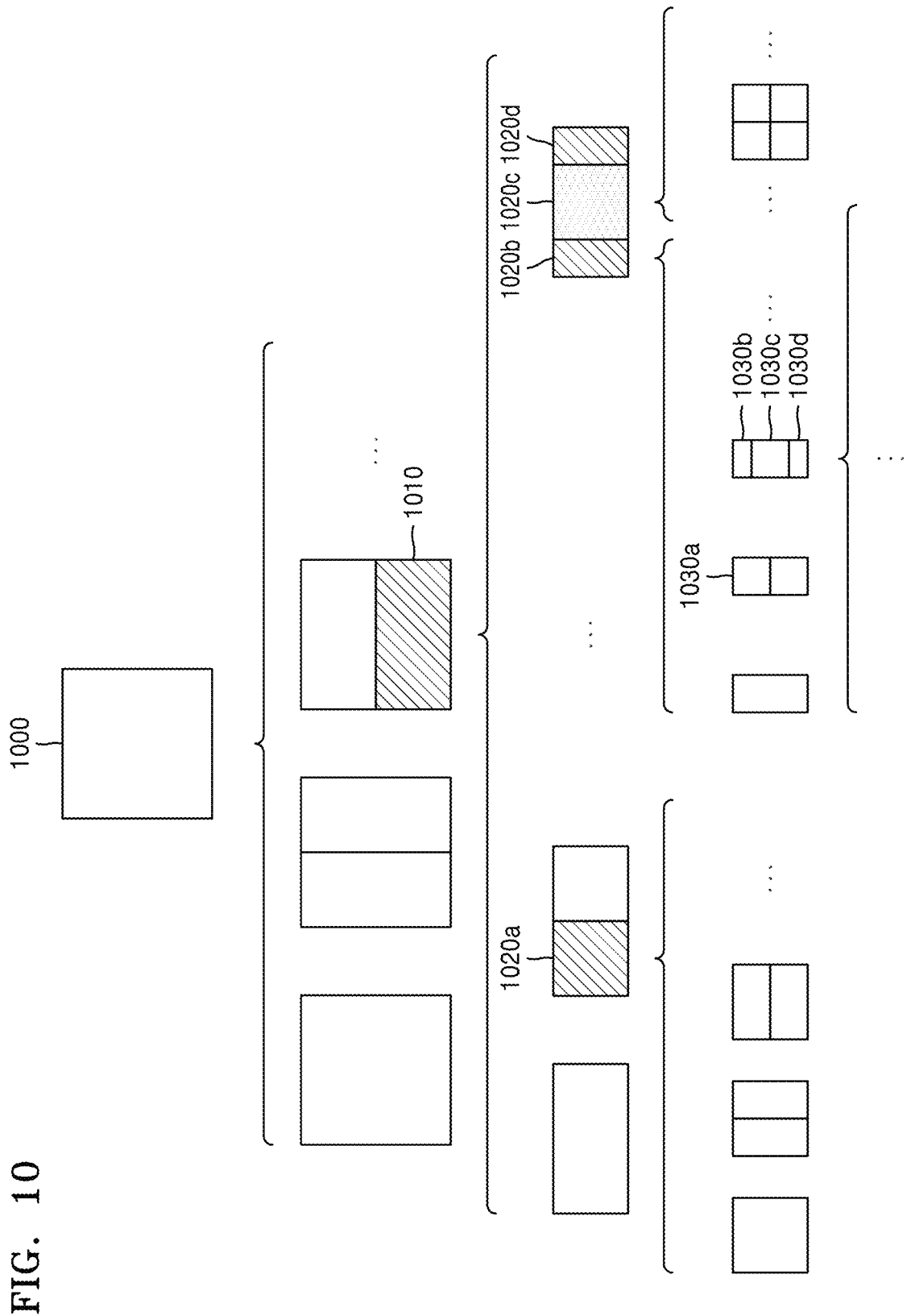
FIG. 10 illustrates a process of splitting a coding unit by a video decoding apparatus, based on at least one of block shape information or information regarding a split type mode, according to an embodiment.

FIG. 10 illustrates a process, performed by the video decoding apparatus 100, of splitting a coding unit based on at least one of block shape information and information regarding a split type mode, according to an embodiment.

According to an embodiment, the video decoding apparatus 100 may determine to split or not to split a square first coding unit 1000 into coding units, based on at least one of the block shape information and the information regarding the split type mode. According to an embodiment, when the information regarding the split type mode indicates to split the first coding unit 1000 in a horizontal direction, the video decoding apparatus 100 may determine a second coding unit 1010 by splitting the first coding unit 1000 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the video decoding apparatus 100 may determine to split or not to split the determined second coding unit 1010 into coding units, based on at least one of the block shape information and the information regarding the split type mode. Referring to FIG. 10, the video decoding apparatus 100 may or may not split the non-square second coding unit 1010, which is determined by splitting the first coding unit 1000, into one or more third coding units 1020a, or 1020b, 1020c, and 1020d based on at least one of the block shape information and the information regarding the split type mode The video decoding apparatus 100 may obtain at least one of the block shape information and the information regarding the split type mode, and determine a plurality of various-shaped second coding units (e.g., 1010) by splitting the first coding unit 1000, based on the obtained at least one of the block shape information and the information regarding the split type mode, and the second coding unit 1010 may be split by using the splitting method of the first coding unit 1000, based on at least one of the block shape information and the information regarding the split type mode. According to an embodiment, when the first coding unit 1000 is split into the second coding units 1010 based on at least one of the block shape information and the information regarding the split type mode of the first coding unit 1000, the second coding unit 1010 may also be split into the third coding units 1020a, or 1020b, 1020c, and 1020d based on at least one of the block shape information and the information regarding the split type mode of the second coding unit 1010. That is, a coding unit may be recursively split based on at least one of the block shape information and the information regarding the split type mode of each coding unit. Therefore, a square coding unit may be determined by splitting a non-square coding unit, and a non-square coding unit may be determined by recursively splitting the square coding unit.

Referring to FIG. 10, a predetermined coding unit from among an odd number of third coding units 1020b, 1020c, and 1020d determined by splitting the non-square second coding unit 1010 (e.g., a coding unit at a center location or a square coding unit) may be recursively split. According to an embodiment, the square third coding unit 1020c from among the odd number of third coding units 1020*b*, 1020*c*, and 1020*d* may be split in a horizontal direction into a plurality of fourth coding units. A non-square fourth coding unit 1030*b* or 1030*d* from among the plurality of fourth coding units 1030*a*, 1030*b*, 1030*c*, and 1030*d* may be split into a plurality of coding units. For example, the non-square fourth coding unit 1030*b* or 1030*d* may be split into an odd number of coding units. A method that can be used for recursive splitting of a coding unit will be described with respect to various embodiments below.

In an embodiment, the video decoding apparatus 100 may split each of the third coding units 1020*a*, 1020*b*, 1020*c*, 1020*d*, etc. into coding units, based on at least one of the block shape information or the information regarding the split type mode. Alternatively, the video decoding apparatus 100 may determine not to split the second coding unit 1010, based on at least one of the block shape information or the information regarding the split type mode. In an embodiment, the video decoding apparatus 100 may split the second coding unit 1010 having a non-square shape into an odd number of third coding units 1020*b*, 1020*c*, and 1020*d*. The video decoding apparatus 100 may place a certain limit on a third coding unit among the odd number of third coding units 1020*b*, 1020*c*, and 1020*d*. For example, the video decoding apparatus 100 may limit the third coding unit 1020*c*, which is located in the middle of the odd number of third coding units 1020*b*, 1020*c* and 1020*d*, not to be split any longer or to be split a set number of times.

Referring to FIG. 10, the video decoding apparatus 100 may restrict the third coding unit 1020*c*, which is at the center location from among the odd number of third coding units 1020*b*, 1020*c*, and 1020*d* included in the non-square second coding unit 1010, to be no longer split, to be split by using a predetermined splitting method (e.g., split into only four coding units or split by using a splitting method of the second coding unit 1010), or to be split only a predetermined number of times (e.g., split only n times (where n>0)). However, the restrictions on the third coding unit 1020*c* at the center location are not limited to the above-described examples, and may include various restrictions for decoding the third coding unit 1020*c* at the center location differently from the other third coding units 1020*b* and 1020*d*.

In an embodiment, the video decoding apparatus 100 may obtain at least one of the block shape information or the information regarding the split type mode, which are used to split a current coding unit, at a certain location on the current coding unit. FIG. 8 illustrates a process of determining at least one coding unit by splitting a current coding unit by the mage decoding apparatus 100, according to an embodiment.

A shape of a block may include 4N×4N, 4N×2N, 2N×4N, 4N×N or N×4N. Here, N may be a positive integer. Block shape information is information representing at least one of a shape, orientation, ratio between width and height, or size of a coding unit.

A shape of the coding unit may include a square shape and a non-square shape. When the width and height of the coding unit are the same (i.e., when a block shape of the coding unit is 4N×4N), the video decoding apparatus 100 may determine the block shape information of the coding unit to be a square. The video decoding apparatus 100 may determine the shape of the coding unit to be a non-square.

When the width and height of the coding unit are different from each other (i.e., when the block shape of the coding unit is 4N×2N, 2N×4N, 4N×N, or N×4N), the video decoding apparatus 100 may determine a non-square as the block shape information of the coding unit. When the coding unit has a non-square shape, the video decoding apparatus 100 may determine the ratio between the width and height of the block shape information of the coding unit to at least one of 1:2, 2:1, 1:4, 4:1, 1:8, or 8:1. The video decoding apparatus 100 may determine whether the coding unit is oriented in the horizontal direction or the vertical direction, based on the width and height of the coding unit. The video decoding apparatus 100 may identify the size of the coding unit, based on at least one of the width, height, or area of the coding unit.

In an embodiment, the video decoding apparatus 100 may determine a shape of a coding unit by using the block shape information, and may determine a form into which the coding unit is to be split by using the information regarding the split type mode. That is, a method of splitting the coding unit, which is indicated by the information regarding the split type mode, may be determined according to a block shape the block shape information used by the video decoding apparatus 100 indicates.

The video decoding apparatus 100 may obtain the information regarding the split type mode from a bitstream. However, the present disclosure is not limited thereto, and the video decoding apparatus 100 and the video encoding apparatus 300 may determine information regarding a predetermined split type mode, based on the block shape information. The video decoding apparatus 100 may determine information regarding a predetermined split type mode for a largest coding unit or a smallest coding unit. For example, the video decoding apparatus 100 may determine 'quad split' as the information regarding the split type mode for the largest coding unit. Alternatively, the video decoding apparatus 100 may determine "no split" as the information regarding the split type mode for the smallest coding unit. In detail, the video decoding apparatus 100 may determine the size of the largest coding unit to be 256×256. The video decoding apparatus 100 may determine 'quad split' as the information regarding the predetermined split type mode. Quad split refers to a split type mode in which both the width and height of a coding unit are bitsected. The video decoding apparatus 100 may obtain a 128×128 coding unit from a 256×256 largest coding unit, based on the information regarding the split type mode. Alternatively, the video decoding apparatus 100 may determine the size of the smallest coding unit to be 4×4. The video decoding apparatus 100 may obtain the information regarding the split type mode indicating "no split" with respect to the smallest coding unit.

In an embodiment, the video decoding apparatus 100 may use block shape information indicating that a current coding unit has a square shape. For example, the video decoding apparatus 100 may determine whether to split a square coding unit, whether to split the square coding unit vertically or horizontally, or to split the square coding unit into 4 coding units, based on the information regarding the split type mode. Referring to FIG. 8, when the block shape information of the current coding unit 800 indicates a square shape, the decoder may not split the coding unit 810*a* having the same size as the current coding unit 800 according to the information regarding the split type mode indicating 'no split', or may determine the coding units 810*b*, 810*c*, and 810*d* obtained by splitting, based on the information regarding the split type mode indicating a certain split method.

In an embodiment, referring to FIG. 8, the video decoding apparatus 100 may determine two coding units 810*b* obtained by splitting the current coding unit 800 in the vertical direction, based on the information regarding the split type mode indicating splitting in the vertical direction. The video decoding apparatus 100 may determine two coding units 810c obtained by splitting the current coding unit 800 in the horizontal direction, based on the information regarding the split type mode indicating splitting in the horizontal direction. The video decoding apparatus 100 may determine four coding units 810d obtained by splitting the current coding unit 800 in the vertical direction and the horizontal direction, based on the information regarding the split type mode indicating splitting in the vertical direction and the horizontal direction. However, a form into which a square coding unit is to be split should not be construed being limited to the above-described forms and should be understood to include various forms indicated by the information regarding the split type mode. Forms into which a square coding unit is to be split will be described in detail with respect to various embodiments below.

FIG. 9 illustrates a process of determining at least one coding unit by splitting a non-square coding unit by the video decoding apparatus 100, according to an embodiment.

In an embodiment, the video decoding apparatus 100 may use block shape information indicating that a current coding unit has a non-square shape. The video decoding apparatus 100 may determine whether a non-square current coding unit is not to be split or is to be split according to a certain method, based on information regarding a split type mode. Referring to FIG. 9, when block shape information of a current coding unit 900 or 950 indicates a non-square shape, the video decoding apparatus 100 may determine a coding unit 910 or 960 having the same size as the current coding unit 900 or 950 according to the information regarding the split type mode indicating 'no split' or determine coding units 920a, 920b, 930a, 930b, 930c, 970a, 970b, 980a, 980b, and 980c obtained by splitting, based on the information regarding the split type mode indicating a certain split method. The certain split method of splitting a non-square coding unit will be described in detail with respect to various embodiments below.

In an embodiment, the video decoding apparatus 100 may determine a form into which a coding unit is to be split by using the information regarding the split type mode. In this case, the information regarding the split type mode may indicate the number of at least one coding unit generated by splitting the coding unit. Referring to FIG. 9, when the information regarding the split type mode indicates that the current coding unit 900 or 950 is to be split into two coding units, the video decoding apparatus 100 may split the current coding unit 900 or 950 to determine the two current coding units 920a and 920b or 970a and 970b included in the current coding unit 900 or 950, based on the information regarding the split type mode.

In an embodiment, when the video decoding apparatus 100 splits the current coding unit 900 or 950 having a non-square shape, based on the information regarding the split type mode, the video decoding apparatus 100 may split the non-square current coding unit 900 or 950 in consideration of a position of a longer side thereof. For example, the video decoding apparatus 100 may determine a plurality of coding units by splitting the current coding unit 900 or 950 such that a longer side of the current coding unit 900 or 950 is split, in consideration of the shape of the current coding unit 900 or 950.

In an embodiment, when the information regarding the split type mode indicates splitting (tri-splitting) a coding unit into an odd number of blocks, the video decoding apparatus 100 may determine an odd number of coding units included in the current coding unit 900 or 950. For example, when the information about the split type mode indicates that the current coding unit 900 or 950 is to be split into three coding units, the video decoding apparatus 100 may split the current coding unit 900 or 950 into three coding units 930a, 930b, and 930c or 980a, 980b, and 980c.

In an embodiment, a ratio between the width and height of the current coding unit 900 or 950 may be 4:1 or 1:4. When the ratio between the width and height is 4:1, the width is longer than the height and thus the block shape information may indicate the horizontal direction. When the ratio between the width and height is 1:4, the width is shorter than the height and thus the block shape information may indicate the vertical direction. The video decoding apparatus 100 may determine that a current coding unit is to be split into an odd number of blocks, based on the information regarding the split type mode. In addition, the video decoding apparatus 100 may determine a direction of splitting the current coding unit 900 or 950, based on the block shape information of the current coding unit 900 or 950. For example, when the current coding unit 900 is oriented in the vertical direction, the video decoding apparatus 100 may determine the coding units 930a, 930b, and 930c by splitting the current coding unit 900 in the horizontal direction. When the current coding unit 950 is oriented in the horizontal direction, the video decoding apparatus 100 may determine the coding units 980a, 980b, and 9380c by splitting the current coding unit 950 in the vertical direction.

In an embodiment, the video decoding apparatus 100 may determine an odd number of coding units included in the current coding unit 900 or 950, and not all the determined coding units may have the same size. For example, the size of the coding unit 930b or 980b among the determined odd number of coding units 930a, 930b, 930c, 980a, 980b, and 980c may be different from those of the other coding units 930a, 930c, 980a, and 980c. That is, coding units that may be determined by splitting the current coding unit 900 or 950 may have a plurality of different sizes, and in some cases, the sizes of the odd number of coding units 930a, 930b, 930c, 980a, 980b, and 980c may be different from one another.

In an embodiment, when the information regarding the split type mode indicates that a coding unit is to be split into an odd number of blocks, the video decoding apparatus 100 may determine an odd number of coding units included in the current coding unit 900 or 950. In addition, the video decoding apparatus 100 may set a certain limit on at least one coding unit among the odd number of coding units generated by splitting. Referring to FIG. 9, the video decoding apparatus 100 may set a decoding process of the coding unit 930b or 980b located in the middle of the three coding units 930a, 930b, and 930c or 980a, 980b, and 980c obtained by splitting the current coding unit 900 or 950 to be different from a decoding process of the other coding units 930a, 930c, 980a, and 980c. For example, the video decoding apparatus 100 may limit the coding unit 930b or 980b located in the middle not to be split no longer or to be split a certain number of times, unlike the other coding units 930a, 930c, 980a, and 980c.

FIG. 10 illustrates a process of splitting a coding unit by the video decoding apparatus 100, based on at least one of block shape information or information regarding a split type mode, according to an embodiment.

In an embodiment, the video decoding apparatus 100 may determine that a first coding unit 1000 having a square shape is to be split or not to be split into coding units, based on at least one of block shape information or information regarding a split type mode. In an embodiment, when the information regarding the split type mode indicates splitting the first coding unit 1000 in the horizontal direction, the video decoding apparatus 100 may determine a second coding unit

1010 by splitting the first coding unit 1000 in the horizontal direction. In an embodiment, the terms "first coding unit", "second coding unit", and "third coding unit" are used herein for understanding of the relationship among these coding units before and after splitting. For example, the second coding unit may be determined by splitting the first coding unit and the third coding unit may be determined by splitting the second coding unit. It may be understood that the relationship among the first coding unit, the second coding unit, and the third coding unit as used hereinafter is based on the above-described features.

In an embodiment, the video decoding apparatus 100 may determine to split or not to split the determined second coding unit 1010 into coding units, based on at least one of the block shape information or the information regarding the split type mode. Referring to FIG. 10, the video decoding apparatus 100 may split the second coding unit 1010 having a non-square shape, which is determined by splitting the first coding unit 1000, into one or more third coding units 1020a, 1020b, 1020c, 1020d, etc. or may not split the second coding unit 1010, based on at least one of the block shape information and the information regarding the split type mode. The video decoding apparatus 100 may obtain at least one of the block shape information or the information regarding the split type mode and obtain a plurality of second coding units having various shapes, including, for example, the second coding unit 1010, by splitting the first coding unit 1000, based on at least one of the block shape information or the information regarding the split type mode. The second coding unit 1010 may be split in the same way that the first coding unit 1000 is split, based at least one of the block shape information or the information regarding the split type mode. In an embodiment, when the first coding unit 1000 is split into the second coding unit 1010, based on at least one of block shape information or information regarding a split type mode of the first coding unit 1000, the second coding unit 1010 may be split into third coding units (e.g., third coding units 1020a, 1020b, 1020c, 1020d, etc.), based on at least one of block shape information or information regarding a split type mode of the second coding unit 1010. That is, each coding unit may be recursively split, based on at least one of information regarding a split type mode and block shape information related thereto. Therefore, a square coding unit may be determined from a non-square coding unit and recursively split to determine a non-square coding unit.

Referring to FIG. 10, a certain coding unit (e.g., a middle coding unit or a square coding unit) among an odd number of third coding units 1020b, 1020c, and 1020d determined by splitting the non-square second coding unit 1010 may be recursively split. In an embodiment, the third coding unit 1020b having a square shape, which is one of the odd number of third coding units 1020b, 1020c, and 1020d, may be split in the horizontal direction into a plurality of fourth coding units. A fourth coding unit 1030b or 1030d having a non-square shape, which is one of a plurality of fourth coding units 1030a, 1030b, 1030c, and 1030d, may be split into a plurality of coding units. For example, the non-square fourth coding unit 1030b or 1030d may be split into an odd number of coding units. A method that can be used for recursive splitting of a coding unit will be described with respect to various embodiments below.

In an embodiment, the video decoding apparatus 100 may split each of the third coding units 1020a, 1020b, 1020c, 1020d, etc. into coding units, based on at least one of the block shape information and the information regarding the split type mode. Alternatively, the video decoding apparatus 100 may determine not to split the second coding unit 1010, based on at least one of the block shape information and the information regarding the split type mode. In an embodiment, the video decoding apparatus 100 may split the second coding unit 1010 having a non-square shape into an odd number of third coding units 1020b, 1020c, and 1020d. The video decoding apparatus 100 may place a certain limit on a third coding unit among the odd number of third coding units 1020b, 1020c, and 1020d. For example, the video decoding apparatus 100 may limit the third coding unit 1020c, which is located in the middle of the odd number of coding units 1020c, not to be split any longer or to be split a set number of times.

Referring to FIG. 10, the video decoding apparatus 100 may limit the third coding unit 1020c, which is located in the middle among the odd number of third coding units 1020b, 1020c, and 1020d included in the non-square second coding unit 1010, not to be split any longer or to be split into a certain form (e.g., to be split into only four coding units or to be split into a form corresponding to the form into which the second coding unit 1010 is split) or to be split a certain number of times (e.g., n times, n>0). However, the above limitations on the third coding unit 1020c located in the middle are merely examples and thus should not be construed as being limited thereto and should be understood to include various limitations so that the third coding unit 1020c may be differently decoded than the other third coding units 1020b and 1020d.

In an embodiment, the video decoding apparatus 100 may obtain at least one of the block shape information or the information regarding the split type mode, which are used to split a current coding unit, at a certain location on the current coding unit.

Figure 11:
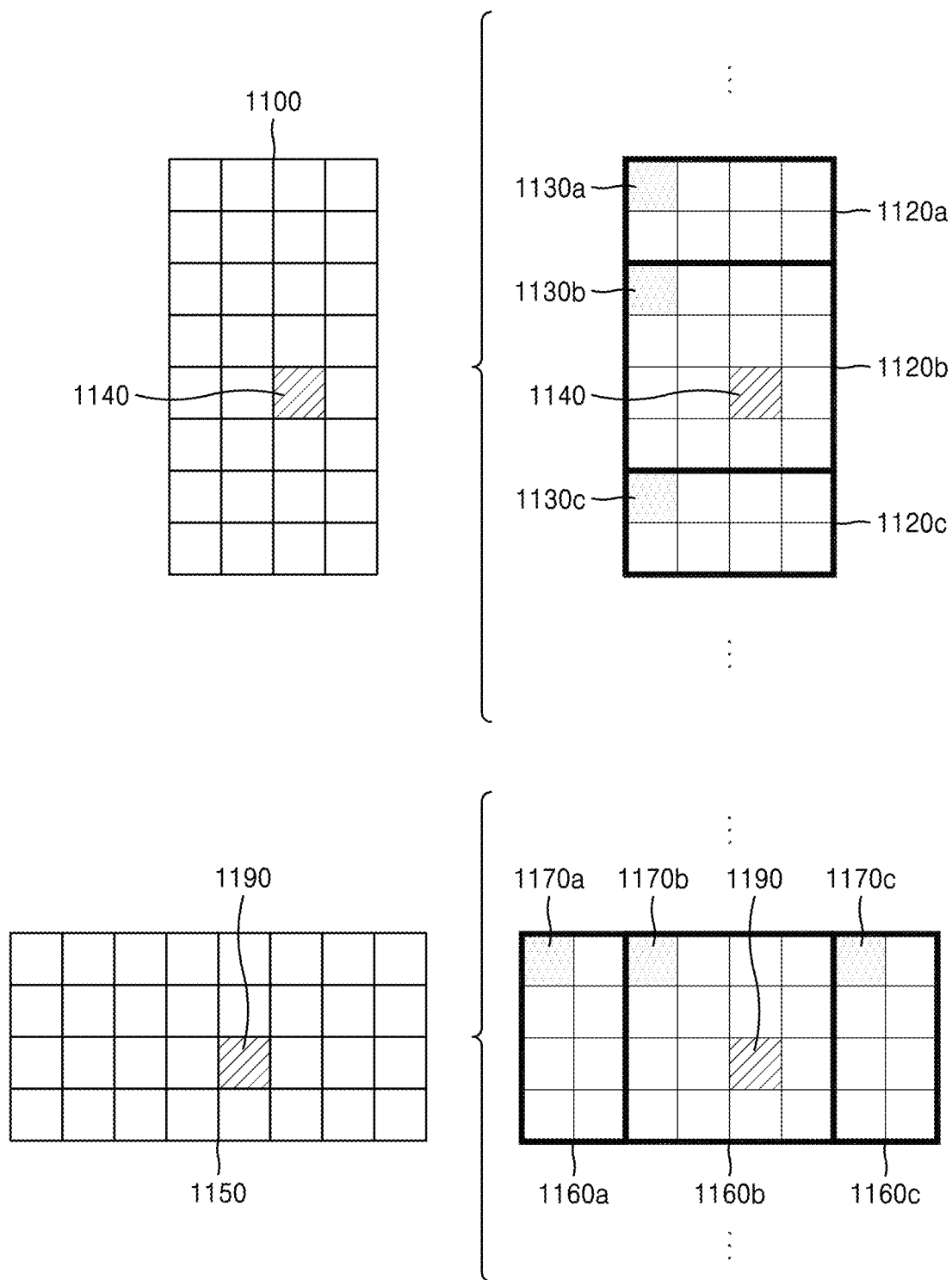
FIG. 11 illustrates a method of determining a certain coding unit among an odd number of coding units by a video decoding apparatus, according to an embodiment.

FIG. 11 illustrates a method of determining a certain coding unit among an odd number of coding units by the video decoding apparatus 100, according to an embodiment.

Referring to FIG. 11, at least one of block shape information and information regarding a split type mode of a current coding unit 1100 may be obtained from a sample of a predetermined location from among a plurality of samples included in the current coding unit 1100 (e.g., a sample 1140 of a center location). However, the predetermined location in the current coding unit 1100, from which at least one of the block shape information and the information regarding the split type mode may be obtained, is not limited to the center location in FIG. 11, and may include various locations included in the current coding unit 1100 (e.g., top, bottom, left, right, top left, bottom left, top right, and bottom right locations). The video decoding apparatus 100 may obtain at least one of the block shape information and the information regarding the split type mode from the predetermined location and determine to split or not to split the current coding unit into various-shaped and various-sized coding units.

According to an embodiment, when the current coding unit is split into a predetermined number of coding units, the video decoding apparatus 100 may select one of the coding units. Various methods may be used to select one of a plurality of coding units, as will be described below in relation to various embodiments.

According to an embodiment, the video decoding apparatus 100 may split the current coding unit into a plurality of coding units, and may determine a coding unit at a predetermined location.

In an embodiment, the video decoding apparatus 100 may use information indicating a position of each of an odd number of coding units to determine a coding unit located in the middle of the odd number of coding units. Referring to FIG. 11, the video decoding apparatus 100 may determine an odd number of coding units 1120a, 1120b, and 1120c or an odd number of coding units 1160a, 1160b and 1160c by splitting a current coding unit 1100 or 1150. The video decoding apparatus 100 may determine the middle coding unit 1120b or 1160b by using information regarding positions of the odd number of coding units 1120a, 1120b, and 1120c or 1160a, 1160b, and 1160c. For example, the video decoding apparatus 100 may determine the middle coding unit 1120b by determining positions of the coding units 1120a, 1120b, and 1120c, based on information indicating a position of a certain sample included in the coding units 1120a, 1120b, and 1120c. In detail, the video decoding apparatus 100 may determine the middle coding unit 1120b by determining the positions of the coding units 1120a, 1120b, and 1120c, based on information indicating positions of samples 1130a, 1130b, and 1130c located at upper left sides of the coding units 1120a, 1120b, and 1120c.

According to an embodiment, the information indicating the locations of the top left samples 1130a, 1130b, and 1130c, which are included in the coding units 1120a, 1120b, and 1120c, respectively, may include information about locations or coordinates of the coding units 1120a, 1120b, and 1120c in a picture. According to an embodiment, the information indicating the locations of the top left samples 1130a, 1130b, and 1130c, which are included in the coding units 1120a, 1120b, and 1120c, respectively, may include information indicating widths or heights of the coding units 1120a, 1120b, and 1120c included in the current coding unit 1100, and the widths or heights may correspond to information indicating differences between the coordinates of the coding units 1120a, 1120b, and 1120c in the picture. That is, the video decoding apparatus 100 may determine the coding unit 1120b at the center location by directly using the information about the locations or coordinates of the coding units 1120a, 1120b, and 1120c in the picture, or by using the information about the widths or heights of the coding units, which correspond to the difference values between the coordinates.

According to an embodiment, information indicating the location of the top left sample 1130a of the upper coding unit 1120a may include coordinates (xa, ya), information indicating the location of the top left sample 1130b of the middle coding unit 1120b may include coordinates (xb, yb), and information indicating the location of the top left sample 1130c of the lower coding unit 1120c may include coordinates (xc, yc). The video decoding apparatus 100 may determine the middle coding unit 1120b by using the coordinates of the top left samples 1130a, 1130b, and 1130c which are included in the coding units 1120a, 1120b, and 1120c, respectively. For example, when the coordinates of the top left samples 1130a, 1130b, and 1130c are sorted in an ascending or descending order, the coding unit 1120b including the coordinates (xb, yb) of the sample 1130b at a center location may be determined as a coding unit at a center location from among the coding units 1120a, 1120b, and 1120c determined by splitting the current coding unit 1100. However, the coordinates indicating the locations of the top left samples 1130a, 1130b, and 1130c may include coordinates indicating absolute locations in the picture, or may use coordinates (dxb, dyb) indicating a relative location of the top left sample 1130b of the middle coding unit 1120b and coordinates (dxc, dyc) indicating a relative location of the top left sample 1130c of the lower coding unit 1120c with reference to the location of the top left sample 1130a of the upper coding unit 1120a. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the video decoding apparatus 100 may split the current coding unit 1100 into a plurality of coding units 1120a, 1120b, and 1120c, and may select one of the coding units 1120a, 1120b, and 1120c based on a predetermined criterion. For example, the video decoding apparatus 100 may select the coding unit 1120b, which has a size different from that of the others, from among the coding units 1120a, 1120b, and 1120c.

According to an embodiment, the video decoding apparatus 100 may determine the widths or heights of the coding units 1120a, 1120b, and 1120c by using the coordinates (xa, ya) indicating the location of the top left sample 1130a of the upper coding unit 1120a, the coordinates (xb, yb) indicating the location of the top left sample 1130b of the middle coding unit 1120b, and the coordinates (xc, yc) indicating the location of the top left sample 1130c of the lower coding unit 1120c. The video decoding apparatus 100 may determine the respective sizes of the coding units 1120a, 1120b, and 1120c by using the coordinates (xa, ya), (xb, yb), and (xc, yc) indicating the locations of the coding units 1120a, 1120b, and 1120c. In an embodiment, the video decoding apparatus 100 may determine a width of the upper coding unit 1120a to be a width of the current coding unit 1100. The video decoding apparatus 100 may determine a height of the upper coding unit 1120a to be (yb−ya). In an embodiment, the video decoding apparatus 100 may determine a width of the middle coding unit 1120b to be that of the current coding unit 1100. The video decoding apparatus 100 may determine a height of the middle coding unit 1120b to be (yc−yb). According to an embodiment, the video decoding apparatus 100 may determine the width or height of the lower coding unit 1120c by using the width or height of the current coding unit 1100 or the widths or heights of the upper and middle coding units 1120a and 1120b. The video decoding apparatus 100 may determine a coding unit, which has a size different from that of the others, based on the determined widths and heights of the coding units 1120a to 1120c. Referring to FIG. 11, the video decoding apparatus 100 may determine the middle coding unit 1120b, which has a size different from the size of the upper and lower coding units 1120a and 1120c, as the coding unit of the predetermined location. However, the above-described method, performed by the video decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The video decoding apparatus 100 may determine a width or height of each of the coding units 1160a, 1160b, and 1160c by using (xd, yd) coordinates representing a position of a sample 1170a located at an upper left side of the left coding unit 1160a, (xe, ye) coordinates representing a position of a sample 1170b located at an upper left side of the middle coding unit 1160b, and (xf, yf) coordinates representing a position of a sample 1170c located at an upper left side of the right coding unit 1160c. The video decoding apparatus 100 may determine sizes of the coding units 1160a, 1160b, and 1160c by using the (xd, yd), (xe, ye), and (xf, yf) coordinates indicating the positions of the coding units 1160*a*, 1160*b*, and 1160*c*.

In an embodiment, the video decoding apparatus 100 may determine a width of the left coding unit 1160*a* to be (xe−xd). The video decoding apparatus 100 may determine a height of the left coding unit 1160*a* to be that of the current coding unit 1150. In an embodiment, the video decoding apparatus 100 may determine a width of the middle coding unit 1160*b* to be (xf−xe). The video decoding apparatus 100 may determine a height of the middle coding unit 1160*b* to be that of the current coding unit 1100. In an embodiment, the video decoding apparatus 100 may determine a width or height of the right coding unit 1160*c* by using the width or height of the current coding unit 1150 and the widths and heights of the left coding unit 1160*a* and the middle coding unit 1160*b*. The video decoding apparatus 100 may determine coding units having different sizes than those of other coding units, based on the determined widths and heights of the coding units 1160*a*, 1160*b*, and 1160*c*. Referring to FIG. 11, the video decoding apparatus 100 may determine the middle coding unit 1160*b* having a different size than those of the left coding unit 1160*a* and the right coding unit 1160*c* to be a coding unit at a certain location. However, a process of determining a coding unit having a different size than those of other coding units by the video decoding apparatus 100 described above is merely an example of determining a coding unit at a certain location by using a size of a coding unit determined based on sample coordinates, and various processes of determining a coding unit at a certain location by comparison of a size of a coding unit determined according to certain sample coordinates may be used.

However, locations of samples considered to determine locations of coding units are not limited to the above-described top left locations, and information about arbitrary locations of samples included in the coding units may be used.

According to an embodiment, the video decoding apparatus 100 may select a coding unit at a predetermined location from among an odd number of coding units determined by splitting the current coding unit, considering the shape of the current coding unit. For example, when the current coding unit has a non-square shape, a width of which is longer than a height, the video decoding apparatus 100 may determine the coding unit at the predetermined location in a horizontal direction. That is, the video decoding apparatus 100 may determine one of coding units at different locations in a horizontal direction and put a restriction on the coding unit. When the current coding unit has a non-square shape, a height of which is longer than a width, the video decoding apparatus 100 may determine the coding unit at the predetermined location in a vertical direction. That is, the video decoding apparatus 100 may determine one of coding units at different locations in a vertical direction and may put a restriction on the coding unit.

In an embodiment, the video decoding apparatus 100 may use information indicating a position of each of an even number of coding units to determine a coding unit located at a certain position among the even number of coding units. The video decoding apparatus 100 may determine an even number of coding units by splitting (binary splitting) a current coding unit, and determine a coding unit at a certain position by using information regarding positions of the even number of coding units. This process may correspond to the process of determining a coding unit at a certain position (e.g., a middle coding unit) among an odd number of coding units, which is described above with reference to FIG. 11, and a detailed description thereof will be omitted here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the video decoding apparatus 100 may use at least one of block shape information and information regarding a split type mode, which is stored in a sample included in a coding unit at a center location, in a splitting operation to determine the coding unit at the center location from among the plurality of coding units determined by splitting the current coding unit.

Referring to FIG. 11, the video decoding apparatus 100 may split the current coding unit 1100 into a plurality of coding units 1120*a*, 1120*b*, and 1120*c* based on at least one of the block shape information and the information regarding the split type mode, and may determine a coding unit 1120*b* at a center location from among the plurality of the coding units 1120*a*, 1120*b*, and 1120*c*. Furthermore, the video decoding apparatus 100 may determine the coding unit 1120*b* at the center location, in consideration of a location from which at least one of the block shape information and the information regarding the split type mode is obtained. That is, at least one of the block shape information and the information regarding the split type mode of the current coding unit 1100 may be obtained from the sample 1140 at a center location of the current coding unit 1100 and, when the current coding unit 1100 is split into the plurality of coding units 1120*a*, 1120*b*, and 1120*c* based on at least one of the block shape information and the information regarding the split type mode, the coding unit 1120*b* including the sample 1140 may be determined as the coding unit at the center location. However, information used to determine the coding unit at the center location is not limited to at least one of the block shape information and the information regarding the split type mode, and various types of information may be used to determine the coding unit at the center location.

According to an embodiment, predetermined information for identifying the coding unit at the predetermined location may be obtained from a predetermined sample included in a coding unit to be determined. Referring to FIG. 11, the video decoding apparatus 100 may use at least one of the block shape information and the information regarding the split type mode, which is obtained from a sample at a predetermined location in the current coding unit 1100 (e.g., a sample at a center location of the current coding unit 1100) to determine a coding unit at a predetermined location from among the plurality of the coding units 1120*a*, 1120*b*, and 1120*c* determined by splitting the current coding unit 1100 (e.g., a coding unit at a center location from among a plurality of split coding units). That is, the video decoding apparatus 100 may determine the sample at the predetermined location by considering a block shape of the current coding unit 1100, determine the coding unit 1120*b* including a sample, from which predetermined information (e.g., at least one of the block shape information and the information regarding the split type mode) may be obtained, from among the plurality of coding units 1120*a*, 1120*b*, and 1120*c* determined by splitting the current coding unit 1100, and may put a predetermined restriction on the coding unit 1120*b*.

Referring to FIG. 11, according to an embodiment, the video decoding apparatus 100 may determine the sample 1140 at the center location of the current coding unit 1100 as the sample from which the predetermined information may be obtained, and may put a predetermined restriction on the coding unit 1120b including the sample 1140, in a decoding operation. However, the location of the sample from which the predetermined information may be obtained is not limited to the above-described location, and may include arbitrary locations of samples included in the coding unit 1120b to be determined for a restriction.

According to an embodiment, the location of the sample from which the predetermined information may be obtained may be determined based on the shape of the current coding unit 1100. According to an embodiment, the block shape information may indicate whether the current coding unit has a square or non-square shape, and the location of the sample from which the predetermined information may be obtained may be determined based on the shape. For example, the video decoding apparatus 100 may determine a sample located on a boundary for dividing at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the video decoding apparatus 100 may determine one of samples adjacent to a boundary for dividing a long side of the current coding unit in half, as the sample from which the predetermined information may be obtained.

According to an embodiment, when the current coding unit is split into a plurality of coding units, the video decoding apparatus 100 may use at least one of the block shape information and the information regarding the split type mode to determine a coding unit at a predetermined location from among the plurality of coding units. According to an embodiment, the video decoding apparatus 100 may obtain at least one of the block shape information and the information regarding the split type mode from a sample at a predetermined location in a coding unit, and split the plurality of coding units, which are generated by splitting the current coding unit, by using at least one of the information regarding the split type mode and the block shape information, which is obtained from the sample of the predetermined location in each of the plurality of coding units. That is, a coding unit may be recursively split based on at least one of the block shape information and the information regarding the split type mode, which is obtained from the sample at the predetermined location in each coding unit. An operation of recursively splitting a coding unit has been described above in relation to FIG. 10, and thus detailed descriptions thereof will not be provided here.

According to an embodiment, the video decoding apparatus 100 may determine one or more coding units by splitting the current coding unit, and may determine an order of decoding the one or more coding units, based on a predetermined block (e.g., the current coding unit).

Figure 12:
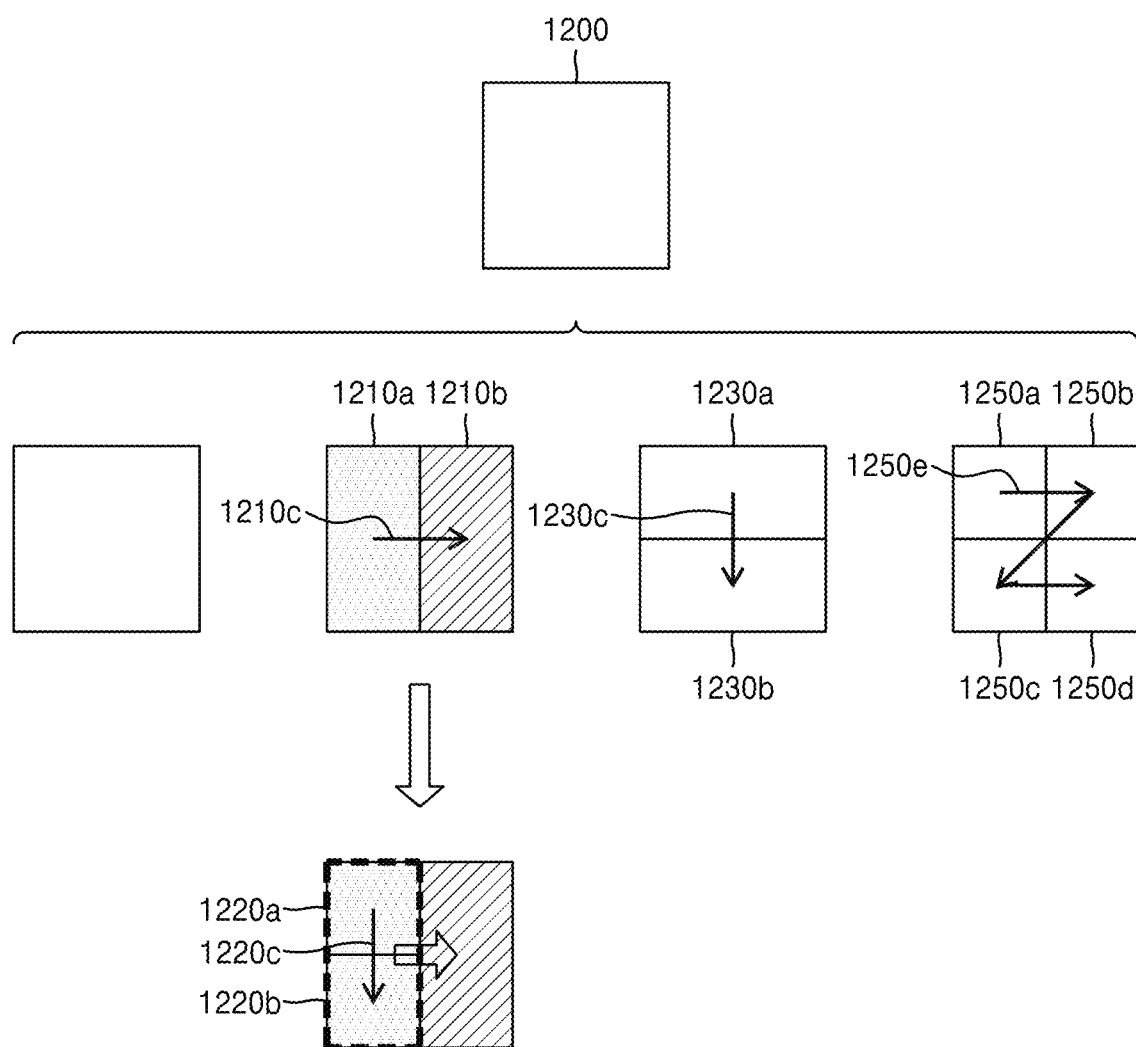
FIG. 12 is a diagram illustrating an order in which a plurality of coding units are processed when the plurality of coding units are determined by splitting a current coding unit by a video decoding apparatus, according to an embodiment.

FIG. 12 illustrates an order of processing a plurality of coding units when the video decoding apparatus 100 determines the plurality of coding units by splitting a current coding unit, according to an embodiment.

According to an embodiment, the video decoding apparatus 100 may determine second coding units 1210a and 1210b by splitting a first coding unit 1200 in a vertical direction, determine second coding units 1230a and 1230b by splitting the first coding unit 1200 in a horizontal direction, or determine second coding units 1250a to 1250d by splitting the first coding unit 1200 in vertical and horizontal directions, based on block shape information and information regarding the split type mode.

Referring to FIG. 12, the video decoding apparatus 100 may determine to process the second coding units 1210a and 1210b, which are determined by splitting the first coding unit 1200 in a vertical direction, in a horizontal direction order 1210c. The video decoding apparatus 100 may determine to process the second coding units 1230a and 1230b, which are determined by splitting the first coding unit 1200 in a horizontal direction, in a vertical direction order 1230c. The video decoding apparatus 100 may determine to process the second coding units 1250a to 1250d, which are determined by splitting the first coding unit 1200 in vertical and horizontal directions, in a predetermined order for processing coding units in a row and then processing coding units in a next row (e.g., in a raster scan order or Z-scan order 1250e).

According to an embodiment, the video decoding apparatus 100 may recursively split coding units. Referring to FIG. 12, the video decoding apparatus 100 may determine a plurality of coding units 1210a, 1210b, 1230a, 1230b, 1250a, 1250b, 1250c, and 1250d by splitting the first coding unit 1200, and may recursively split each of the determined plurality of coding units 1210a, 1210b, 1230a, 1230b, 1250a, 1250b, 1250c, and 1250d. A splitting method of the plurality of coding units 1210a, 1210b, 1230a, 1230b, 1250a, 1250b, 1250c, and 1250d may correspond to a splitting method of the first coding unit 1200. As such, each of the plurality of coding units 1210a, 1210b, 1230a, 1230b, 1250a, 1250b, 1250c, and 1250d may be independently split into a plurality of coding units. Referring to FIG. 12, the video decoding apparatus 100 may determine the second coding units 1210a and 1210b by splitting the first coding unit 1200 in a vertical direction, and may determine to independently split or not to split each of the second coding units 1210a and 1210b.

According to an embodiment, the video decoding apparatus 100 may determine third coding units 1220a and 1220b by splitting the left second coding unit 1210a in a horizontal direction, and may not split the right second coding unit 1210b.

According to an embodiment, a processing order of coding units may be determined based on an operation of splitting a coding unit. In other words, a processing order of split coding units may be determined based on a processing order of coding units immediately before being split. The video decoding apparatus 100 may determine a processing order of the third coding units 1220a and 1220b determined by splitting the left second coding unit 1210a, independently of the right second coding unit 1210b. Because the third coding units 1220a and 1220b are determined by splitting the left second coding unit 1210a in a horizontal direction, the third coding units 1220a and 1220b may be processed in a vertical direction order 1220c. Because the left and right second coding units 1210a and 1210b are processed in the horizontal direction order 1210c, the right second coding unit 1210b may be processed after the third coding units 1220a and 1220b included in the left second coding unit 1210a are processed in the vertical direction order 1220c. An operation of determining a processing order of coding units based on a coding unit before being split is not limited to the above-described example, and various methods may be used to independently process coding units, which are split and determined to various shapes, in a predetermined order.

Figure 13:
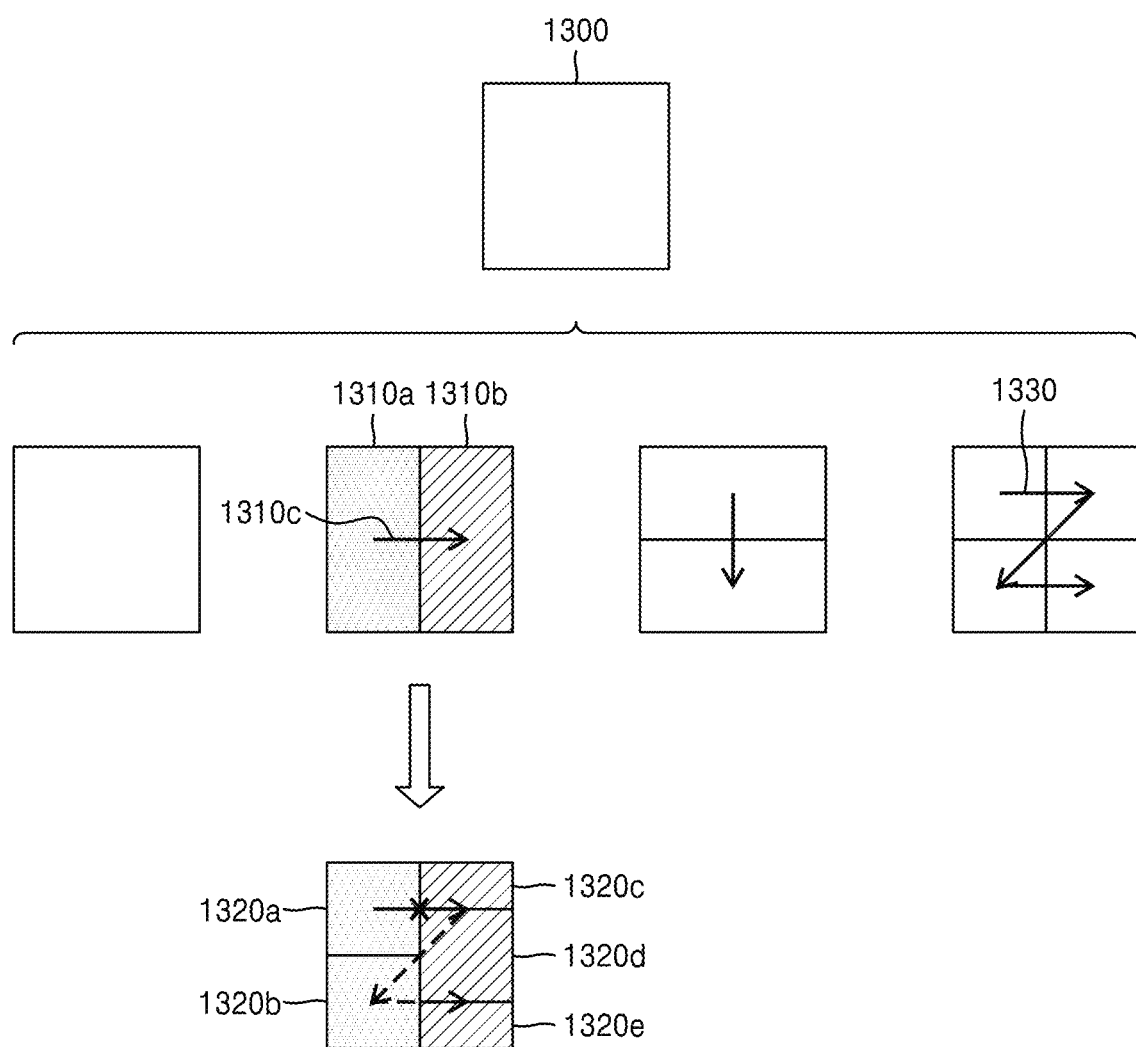
FIG. 13 illustrates a process of determining, by a video decoding apparatus, that a current coding unit is split into an odd number of coding units when coding units cannot be processed in a certain order, according to an embodiment.

FIG. 13 illustrates a process, performed by the video decoding apparatus 100, of determining that a current coding unit is to be split into an odd number of coding units, when the coding units are not processable in a predetermined order, according to an embodiment.

According to an embodiment, the video decoding apparatus 100 may determine whether the current coding unit is split into an odd number of coding units, based on obtained block shape information and information regarding the split type mode. Referring to FIG. 13, a square first coding unit 1300 may be split into non-square second coding units 1310a and 1310b, and the second coding units 1310a and 1310b may be independently split into third coding units 1320a and 1320b, and 1320c to 1320e. According to an embodiment, the video decoding apparatus 100 may determine a plurality of third coding units 1320a and 1320b by splitting the left second coding unit 1310a in a horizontal direction, and may split the right second coding unit 1310b into an odd number of third coding units 1320c to 1320e.

According to an embodiment, the video decoding apparatus 100 may determine whether any coding unit is split into an odd number of coding units, by determining whether the third coding units 1320a and 1320b, and 1320c to 1320e are processable in a predetermined order. Referring to FIG. 13, the video decoding apparatus 100 may determine the third coding units 1320a and 1320b, and 1320c to 1320e by recursively splitting the first coding unit 1300. The video decoding apparatus 100 may determine whether any of the first coding unit 1300, the second coding units 1310a and 1310b, and the third coding units 1320a and 1320b, and 1320c, 1320d, and 1320e are split into an odd number of coding units, based on at least one of the block shape information and the information regarding the split type mode. For example, the right second coding unit 1310b may be split into an odd number of third coding units 1320c, 1320d, and 1320e. A processing order of a plurality of coding units included in the first coding unit 1300 may be a predetermined order (e.g., a Z-scan order 1330), and the video decoding apparatus 100 may decide whether the third coding units 1320c, 1320d, and 1320e, which are determined by splitting the right second coding unit 1310b into an odd number of coding units, satisfy a condition for processing in the predetermined order.

According to an embodiment, the video decoding apparatus 100 may determine whether the third coding units 1320a and 1320b, and 1320c, 1320d, and 1320e included in the first coding unit 1300 satisfy the condition for processing in the predetermined order, and the condition relates to whether at least one of a width and height of the second coding units 1310a and 1310b is divided in half along a boundary of the third coding units 1320a and 1320b, and 1320c, 1320d, and 1320e. For example, the third coding units 1320a and 1320b determined by dividing the height of the non-square left second coding unit 1310a in half satisfy the condition. However, because boundaries of the third coding units 1320c, 1320d, and 1320e determined by splitting the right second coding unit 1310b into three coding units do not divide the width or height of the right second coding unit 1310b in half, it may be determined that the third coding units 1320c, 1320d, and 1320e do not satisfy the condition.

When the condition is not satisfied as described above, the video decoding apparatus 100 may decide disconnection of a scan order, and determine that the right second coding unit 1310b is split into an odd number of coding units, based on a result of the determination.

According to an embodiment, when a coding unit is split into an odd number of coding units, the video decoding apparatus 100 may put a predetermined restriction on a coding unit at a predetermined location among the split coding units. The restriction or the predetermined location has been described above in relation to various embodiments, and thus detailed descriptions thereof will not be provided here.

Figure 14:
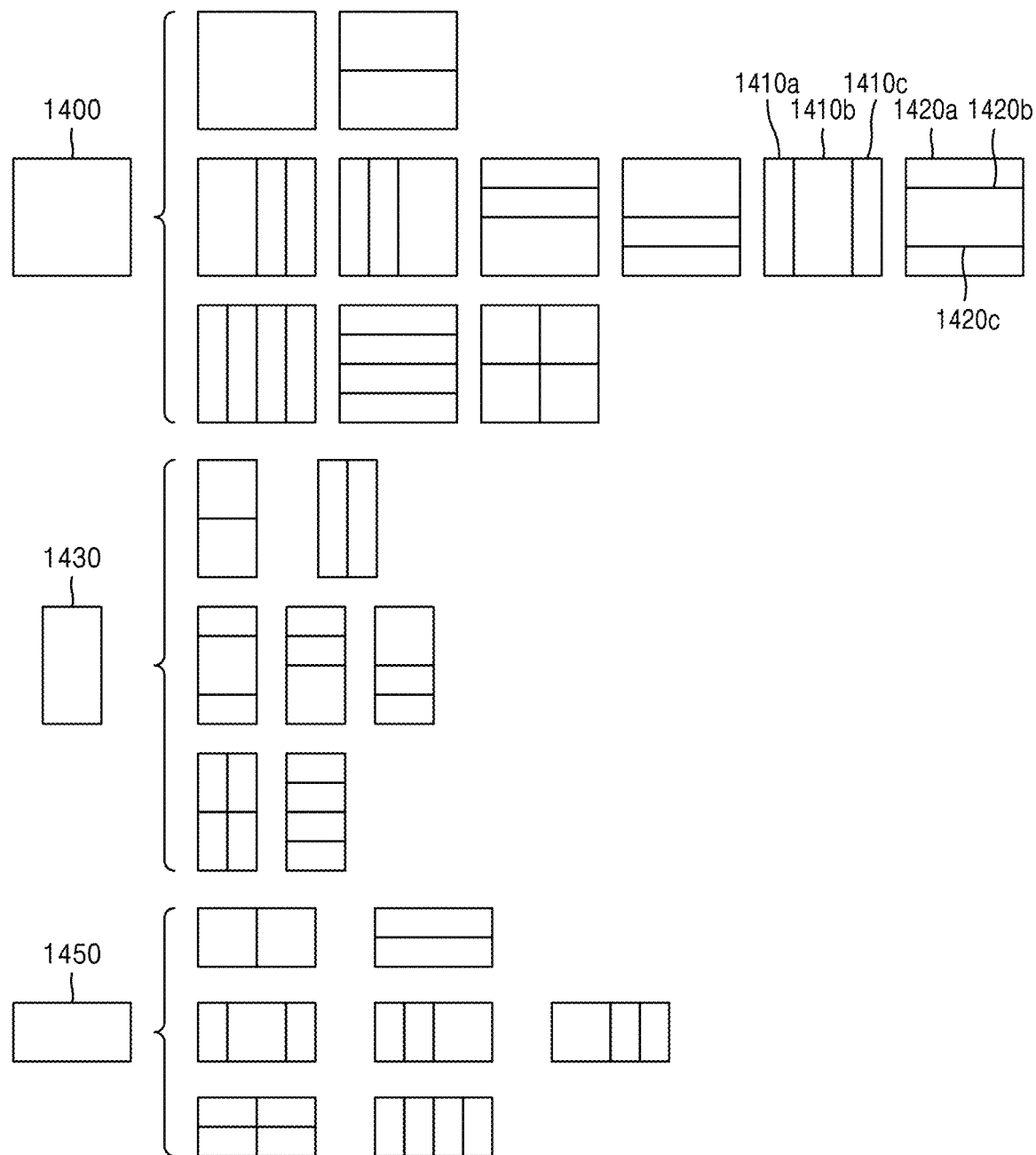
FIG. 14 illustrates a process of determining, by a video decoding apparatus, at least one coding unit by splitting a first coding unit, according to an embodiment.

FIG. 14 illustrates a process, performed by the video decoding apparatus 100, of determining at least one coding unit by splitting a first coding unit 1400, according to an embodiment.

According to an embodiment, the video decoding apparatus 100 may split the first coding unit 1400, based on at least one of block shape information and information regarding the split type mode, which is obtained by a receiver. The square first coding unit 1400 may be split into four square coding units, or may be split into a plurality of non-square coding units. For example, referring to FIG. 14, when the block shape information indicates that the first coding unit 1400 has a square shape and the information regarding the split type mode indicates to split the first coding unit 1400 into non-square coding units, the video decoding apparatus 100 may split the first coding unit 1400 into a plurality of non-square coding units. In detail, when the information regarding the split type mode indicates to determine an odd number of coding units by splitting the first coding unit 1400 in a horizontal direction or a vertical direction, the video decoding apparatus 100 may split the square first coding unit 1400 into an odd number of coding units, e.g., second coding units 1410a, 1410b, and 1410c determined by splitting the square first coding unit 1400 in a vertical direction or second coding units 1420a, 1420b, and 1420c determined by splitting the square first coding unit 1400 in a horizontal direction.

According to an embodiment, the video decoding apparatus 100 may determine whether the second coding units 1410a, 1410b, 1410c, 1420a, 1420b, and 1420c included in the first coding unit 1400 satisfy a condition for processing in a predetermined order, and the condition relates to whether at least one of a width and height of the first coding unit 1400 is divided in half along a boundary of the second coding units 1410a, 1410b, 1410c, 1420a, 1420b, and 1420c. Referring to FIG. 14, because boundaries of the second coding units 1410a, 1410b, and 1410c determined by splitting the square first coding unit 1400 in a vertical direction do not divide the width of the first coding unit 1400 in half, it may be determined that the first coding unit 1400 does not satisfy the condition for processing in the predetermined order. In addition, because boundaries of the second coding units 1420a, 1420b, and 1420c determined by splitting the square first coding unit 1400 in a horizontal direction do not divide the width of the first coding unit 1400 in half, it may be determined that the first coding unit 1400 does not satisfy the condition for processing in the predetermined order. When the condition is not satisfied as described above, the video decoding apparatus 100 may decide disconnection of a scan order, and may determine that the first coding unit 1400 is split into an odd number of coding units, based on a result of the decision. According to an embodiment, when a coding unit is split into an odd number of coding units, the video decoding apparatus 100 may put a predetermined restriction on a coding unit at a predetermined location from among the split coding units. The restriction or the predetermined location has been described above in relation to various embodiments, and thus detailed descriptions thereof will not be provided herein.

According to an embodiment, the video decoding apparatus 100 may determine various-shaped coding units by splitting a first coding unit.

Referring to FIG. 14, the video decoding apparatus 100 may split the square first coding unit 1400 or a non-square first coding unit 1430 or 1450 into various-shaped coding units.

Figure 15:
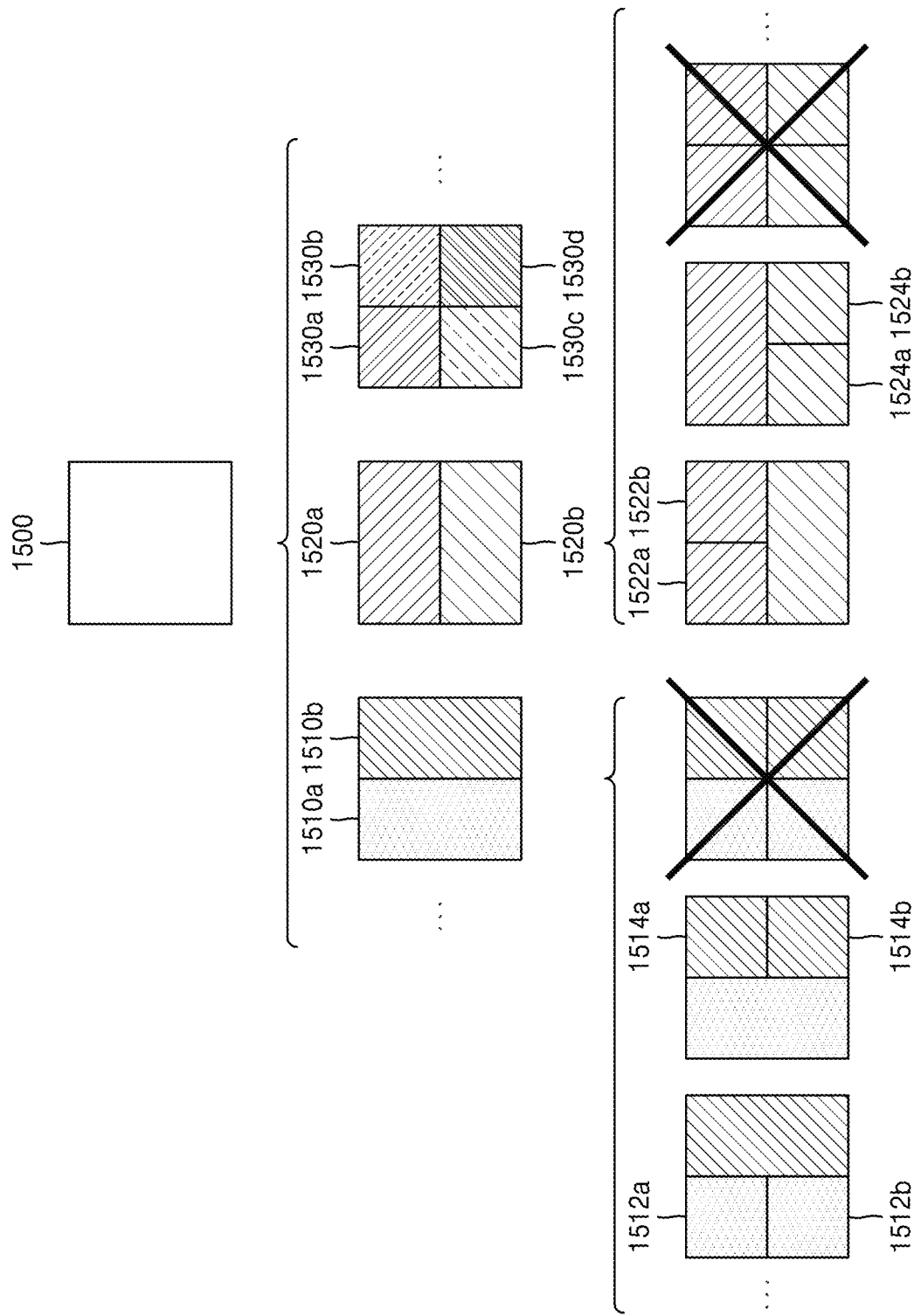
FIG. 15 illustrates a case in which, when a non-square second coding unit determined by splitting a first coding unit by a video decoding apparatus satisfies a certain condition, a form into which the second coding unit may be split is limited, according to an embodiment.

FIG. 15 illustrates that a shape into which a second coding unit is splittable by the video decoding apparatus 100 is restricted when the second coding unit having a non-square shape, which is determined by splitting a first coding unit 1500, satisfies a predetermined condition, according to an embodiment.

According to an embodiment, the video decoding apparatus 100 may determine to split the square first coding unit 1500 into non-square second coding units 1510a, 1510b, 1520a, and 1520b, based on at least one of block shape information and information regarding the split type mode, which is obtained by the receiver. The second coding units 1510a, 1510b, 1520a, and 1520b may be independently split. As such, the video decoding apparatus 100 may determine to split or not to split the first coding unit 1500 into a plurality of coding units, based on at least one of the block shape information and the information regarding the split type mode of each of the second coding units 1510a, 1510b, 1520a, and 1520b. According to an embodiment, the video decoding apparatus 100 may determine third coding units 1512a and 1512b by splitting the non-square left second coding unit 1510a, which is determined by splitting the first coding unit 1500 in a vertical direction, in a horizontal direction. However, when the left second coding unit 1510a is split in a horizontal direction, the video decoding apparatus 100 may restrict the right second coding unit 1510b to not be split in a horizontal direction in which the left second coding unit 1510a is split. When third coding units 1514a and 1514b are determined by splitting the right second coding unit 1510b in a same direction, because the left and right second coding units 1510a and 1510b are independently split in a horizontal direction, the third coding units 1512a, 1512b, 1514a, and 1514b may be determined. However, this case serves equally as a case in which the video decoding apparatus 100 splits the first coding unit 1500 into four square second coding units 1530a, 1530b, 1530c, and 1530d, based on at least one of the block shape information and the information regarding the split type mode, and may be inefficient in terms of image decoding.

According to an embodiment, the video decoding apparatus 100 may determine third coding units 1522a, 1522b, 1524a, and 1524b by splitting the non-square second coding unit 1520a or 1520b, which is determined by splitting the first coding unit 1500 in a horizontal direction, in a vertical direction. However, when a second coding unit (e.g., the upper second coding unit 1520a) is split in a vertical direction, for the above-described reason, the video decoding apparatus 100 may restrict the other second coding unit (e.g., the lower second coding unit 1520b) to not be split in a vertical direction in which the upper second coding unit 1520a is split.

Figure 16:
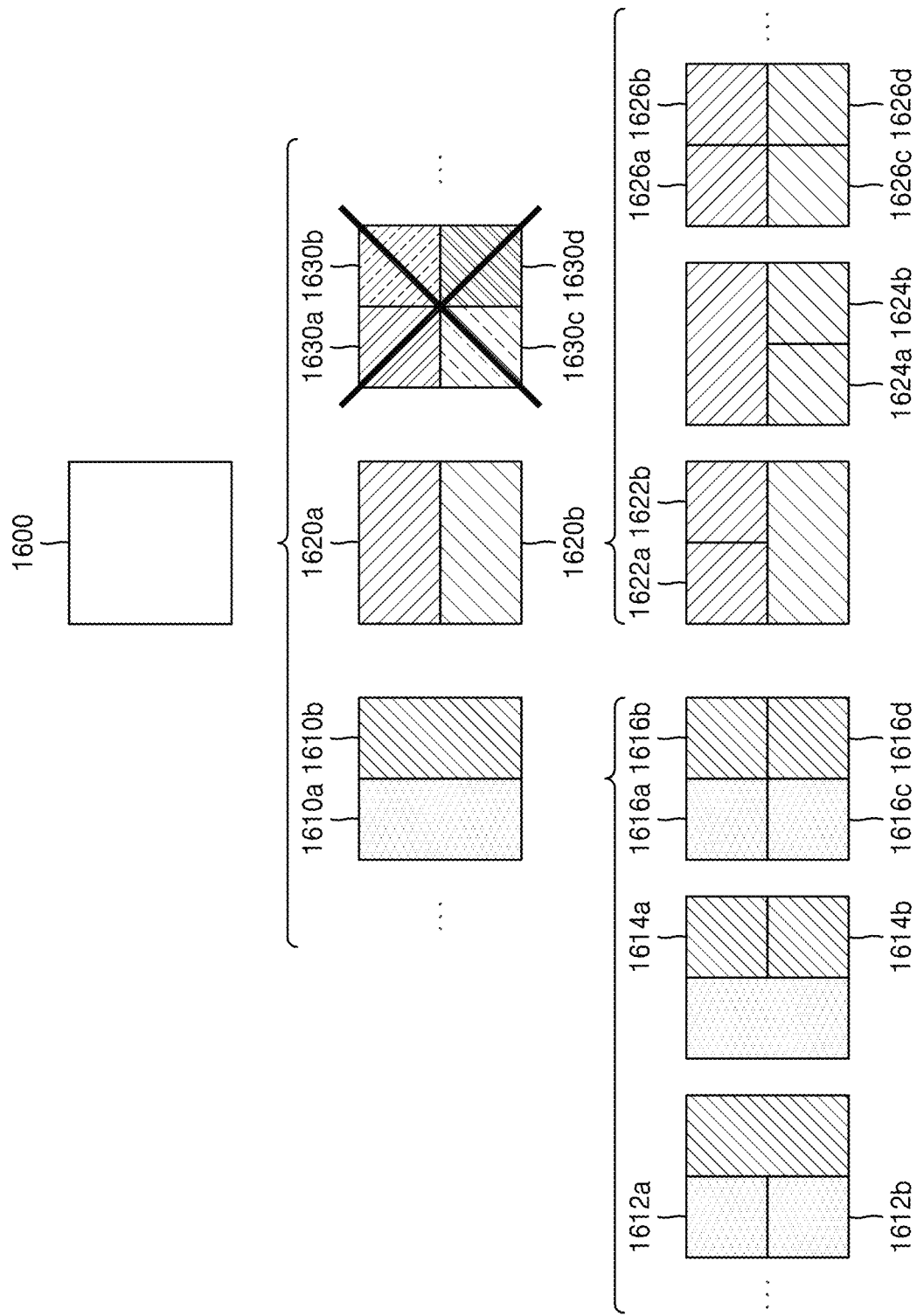
FIG. 16 illustrates a process of splitting a square coding unit by a video decoding apparatus when information regarding a split type mode indicates that the square coding unit cannot be split into four square coding units.

FIG. 16 illustrates a process, performed by the video decoding apparatus 100, of splitting a square coding unit when information regarding the split type mode indicates that the square coding unit is not to be split into four square coding units, according to an embodiment.

According to an embodiment, the video decoding apparatus 100 may determine second coding units 1610a, 1610b, 1620a, 1620b, etc. by splitting a first coding unit 1600, based on at least one of block shape information and information regarding the split type mode. The information regarding the split type mode may include information about various methods of splitting a coding unit but, the information about various splitting methods may not include information for splitting a coding unit into four square coding units. According to such information regarding the split type mode, the video decoding apparatus 100 may not split the first square coding unit 1600 into four square second coding units 1630a, 1630b, 1630c, and 1630d. The video decoding apparatus 100 may determine the non-square second coding units 1610a, 1610b, 1620a, 1620b, etc., based on the information regarding the split type mode.

According to an embodiment, the video decoding apparatus 100 may independently split the non-square second coding units 1610a, 1610b, 1620a, 1620b, etc. Each of the second coding units 1610a, 1610b, 1620a, 1620b, etc. may be recursively split in a predetermined order, and this splitting method may correspond to a method of splitting the first coding unit 1600, based on at least one of the block shape information and the information regarding the split type mode.

For example, the video decoding apparatus 100 may determine square third coding units 1612a and 1612b by splitting the left second coding unit 1610a in a horizontal direction, and may determine square third coding units 1614a and 1614b by splitting the right second coding unit 1610b in a horizontal direction. Furthermore, the video decoding apparatus 100 may determine square third coding units 1616a, 1616b, 1616c, and 1616d by splitting both of the left and right second coding units 1610a and 1610b in a horizontal direction. In this case, coding units having the same shape as the four square second coding units 1630a, 1630b, 1630c, and 1630d split from the first coding unit 1600 may be determined.

As another example, the video decoding apparatus 100 may determine square third coding units 1622a and 1622b by splitting the upper second coding unit 1620a in a vertical direction, and may determine square third coding units 1624a and 1624b by splitting the lower second coding unit 1620b in a vertical direction. Furthermore, the video decoding apparatus 100 may determine square third coding units 1626a, 1626b, 1626a, 1626b by splitting both of the upper and lower second coding units 1620a and 1620b in a vertical direction. In this case, coding units having the same shape as the four square second coding units 1630a, 1630b, 1630c, and 1630d split from the first coding unit 1600 may be determined.

Figure 17:
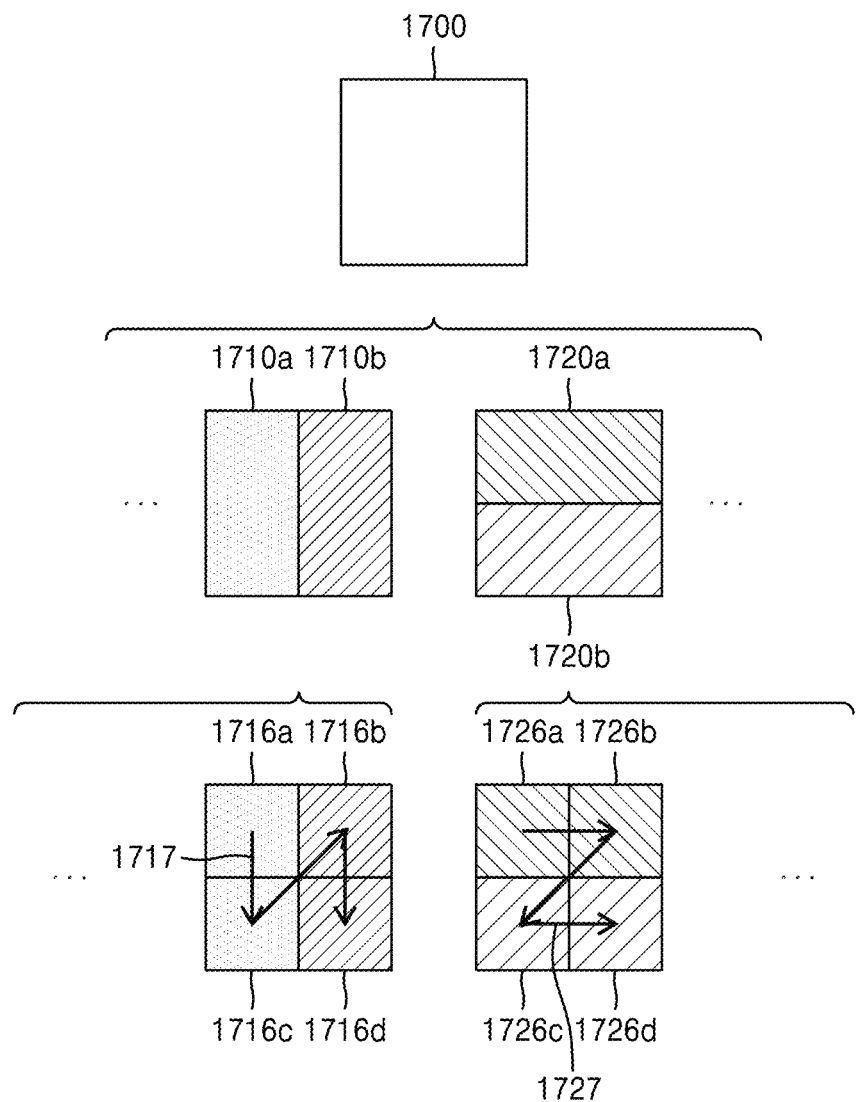
FIG. 17 illustrates that a processing order between a plurality of coding units may be changed depending on a process of splitting a coding unit, according to an embodiment.

FIG. 17 illustrates that a processing order between a plurality of coding units may be changed depending on a process of splitting a coding unit, according to an embodiment.

According to an embodiment, the video decoding apparatus 100 may split a first coding unit 1700, based on block shape information and information regarding the split type mode. When the block shape information indicates a square shape and the information regarding the split type mode indicates to split the first coding unit 1700 in at least one of horizontal and vertical directions, the video decoding apparatus 100 may determine second coding units 1710a, 1710b, 1720a, 1720b, or the like by splitting the first coding unit 1700.

Referring to FIG. 17, the non-square second coding units 1710a, 1710b, 1720a, and 1720b determined by splitting the first coding unit 1700 in only a horizontal direction or vertical direction may be independently split based on the block shape information and the information regarding the split type mode of each coding unit. For example, the video decoding apparatus 100 may determine third coding units 1716a, 1716b, 1716c, and 1716d by splitting the second coding units 1710a and 1710b, which are generated by splitting the first coding unit 1700 in a vertical direction, in a horizontal direction, and may determine third coding units 1726a, 1726b, 1726c, and 1726d by splitting the second coding units 1720a and 1720b, which are generated by splitting the first coding unit 1700 in a horizontal direction, in a horizontal direction. An operation of splitting the second coding units 1710a, 1710b, 1720a, and 1720b has been described above in relation to FIG. 16, and thus detailed descriptions thereof will not be provided herein.

According to an embodiment, the video decoding apparatus 100 may process coding units in a predetermined order. An operation of processing coding units in a predetermined order has been described above in relation to FIG. 12, and thus detailed descriptions thereof will not be provided herein. Referring to FIG. 17, the video decoding apparatus 100 may determine four square third coding units 1716a, 1716b, 1716c, and 1716d, and 1726a, 1726b, 1726c, and 1726d by splitting the square first coding unit 1700. According to an embodiment, the video decoding apparatus 100 may determine processing orders of the third coding units 1716a, 1716b, 1716c, and 1716d, and 1726a, 1726b, 1726c, and 1726d based on a splitting method of the first coding unit 1700.

According to an embodiment, the video decoding apparatus 100 may determine the third coding units 1716a, 1716b, 1716c, and 1716d by splitting the second coding units 1710a and 1710b generated by splitting the first coding unit 1700 in a vertical direction, in a horizontal direction, and may process the third coding units 1716a, 1716b, 1716c, and 1716d in a processing order 1717 for initially processing the third coding units 1716a and 1716b, which are included in the left second coding unit 1710a, in a vertical direction and then processing the third coding unit 1716c and 1716d, which are included in the right second coding unit 1710b, in a vertical direction.

According to an embodiment, the video decoding apparatus 100 may determine the third coding units 1726a, 1726b, 1726c, and 1726d by splitting the second coding units 1720a and 1720b generated by splitting the first coding unit 1700 in a horizontal direction, in a vertical direction, and may process the third coding units 1726a, 1726b, 1726c, and 1726d in a processing order 1727 for initially processing the third coding units 1726a and 1726b, which are included in the upper second coding unit 1720a, in a horizontal direction and then processing the third coding unit 1726c and 1726d, which are included in the lower second coding unit 1720b, in a horizontal direction.

Referring to FIG. 17, the square third coding units 1716a, 1716b, 1716c, and 1716d, and 1726a, 1726b, 1726c, and 1726d may be determined by splitting the second coding units 1710a, 1710b, 1720a, and 1720b, respectively. Although the second coding units 1710a and 1710b are determined by splitting the first coding unit 1700 in a vertical direction differently from the second coding units 1720a and 1720b which are determined by splitting the first coding unit 1700 in a horizontal direction, the third coding units 1716a, 1716b, 1716c, and 1716d, and 1726a, 1726b, 1726c, and 1726d split therefrom eventually show same-shaped coding units split from the first coding unit 1700. As such, by recursively splitting a coding unit in different manners based on at least one of the block shape information and the information regarding the split type mode, the video decoding apparatus 100 may process a plurality of coding units in different orders even when the coding units are eventually determined to be the same shape.

FIG. 18 illustrates a process of determining a depth of a coding unit as a shape and size of the coding unit change, when the coding unit is recursively split such that a plurality of coding units are determined, according to an embodiment.

According to an embodiment, the video decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the video decoding apparatus 100 may determine that a depth of the current coding unit is increased from a depth of the coding unit before being split, by n. In the following description, a coding unit having an increased depth is expressed as a coding unit of a deeper depth.

Referring to FIG. 18, according to an embodiment, the video decoding apparatus 100 may determine a second coding unit 1802 and a third coding unit 1804 of deeper depths by splitting a square first coding unit 1800 based on block shape information indicating a square shape (for example, the block shape information may be expressed as '0: SQUARE'). Assuming that the size of the square first coding unit 1800 is 2N×2N, the second coding unit 1802 determined by dividing a width and height of the first coding unit 1800 to ½ may have a size of N×N. Furthermore, the third coding unit 1804 determined by dividing a width and height of the second coding unit 1802 to ½ may have a size of N/2×N/2. In this case, a width and height of the third coding unit 1804 are ¼ times those of the first coding unit 1800. When a depth of the first coding unit 1800 is D, a depth of the second coding unit 1802, the width and height of which are ½ times those of the first coding unit 1800, may be D+1, and a depth of the third coding unit 1804, the width and height of which are ¼ times those of the first coding unit 1800, may be D+2.

According to an embodiment, the video decoding apparatus 100 may determine a second coding unit 1812 or 1822 and a third coding unit 1814 or 1824 of deeper depths by splitting a non-square first coding unit 1810 or 1820 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The video decoding apparatus 100 may determine a second coding unit 1802, 1812, or 1822 by dividing at least one of a width and height of the first coding unit 1810 having a size of N×2N. That is, the video decoding apparatus 100 may determine the second coding unit 1802 having a size of N×N or the second coding unit 1822 having a size of N×N/2 by splitting the first coding unit 1810 in a horizontal direction, or may determine the second coding unit 1812 having a size of N/2×N by splitting the first coding unit 1810 in horizontal and vertical directions.

According to an embodiment, the video decoding apparatus 100 may determine the second coding unit 1802, 1812, or 1822 by dividing at least one of a width and height of the first coding unit 1818 having a size of 2N×N. That is, the video decoding apparatus 100 may determine the second coding unit 1802 having a size of N×N or the second coding unit 1812 having a size of N/2×N by splitting the first coding unit 1820 in a vertical direction, or may determine the second coding unit 1822 having a size of N×N/2 by splitting the first coding unit 1820 in horizontal and vertical directions.

According to an embodiment, the video decoding apparatus 100 may determine a third coding unit 1804, 1814, or 1824 by dividing at least one of a width and height of the second coding unit 1802 having a size of N×N. That is, the video decoding apparatus 100 may determine the third coding unit 1804 having a size of N/2×N/2, the third coding unit 1814 having a size of N/4×N/2, or the third coding unit 1824 having a size of N/2×N/4 by splitting the second coding unit 1802 in vertical and horizontal directions.

According to an embodiment, the video decoding apparatus 100 may determine the third coding unit 1804, 1814, or 1824 by dividing at least one of a width and height of the second coding unit 1812 having a size of N/2×N. That is, the video decoding apparatus 100 may determine the third coding unit 1804 having a size of N/2×N/2 or the third coding unit 1824 having a size of N/2×N/4 by splitting the second coding unit 1812 in a horizontal direction, or may determine the third coding unit 1814 having a size of N/4×N/2 by splitting the second coding unit 1812 in vertical and horizontal directions.

According to an embodiment, the video decoding apparatus 100 may determine the third coding unit 1804, 1814, or 1824 by dividing at least one of a width and height of the second coding unit 1822 having a size of N×N/2. That is, the video decoding apparatus 100 may determine the third coding unit 1804 having a size of N/2×N/2 or the third coding unit 1814 having a size of N/4×N/2 by splitting the second coding unit 1822 in a vertical direction, or may determine the third coding unit 1824 having a size of N/2×N/4 by splitting the second coding unit 1822 in vertical and horizontal directions.

According to an embodiment, the video decoding apparatus 100 may split the square coding unit 1800, 1802, or 1804 in a horizontal or vertical direction. For example, the video decoding apparatus 100 may determine the first coding unit 1810 having a size of N×2N by splitting the first coding unit 1800 having a size of 2N×2N in a vertical direction, or may determine the first coding unit 1820 having a size of 2N×N by splitting the first coding unit 1800 in a horizontal direction. According to an embodiment, when a depth is determined based on the length of the longest side of a coding unit, a depth of a coding unit determined by splitting the first coding unit 1800, 1802 or 1804 having a size of 2N×2N in a horizontal or vertical direction may be the same as the depth of the first coding unit 1800, 1802 or 1804.

According to an embodiment, a width and height of the third coding unit 1814 or 1824 may be ¼ times those of the first coding unit 1810 or 1820. When a depth of the first coding unit 1810 or 1820 is D, a depth of the second coding unit 1812 or 1822, the width and height of which are ½ times those of the first coding unit 1810 or 1820, may be D+1, and a depth of the third coding unit 1814 or 1824, the width and height of which are ¼ times those of the first coding unit 1810 or 1820, may be D+2.

Figure 19:
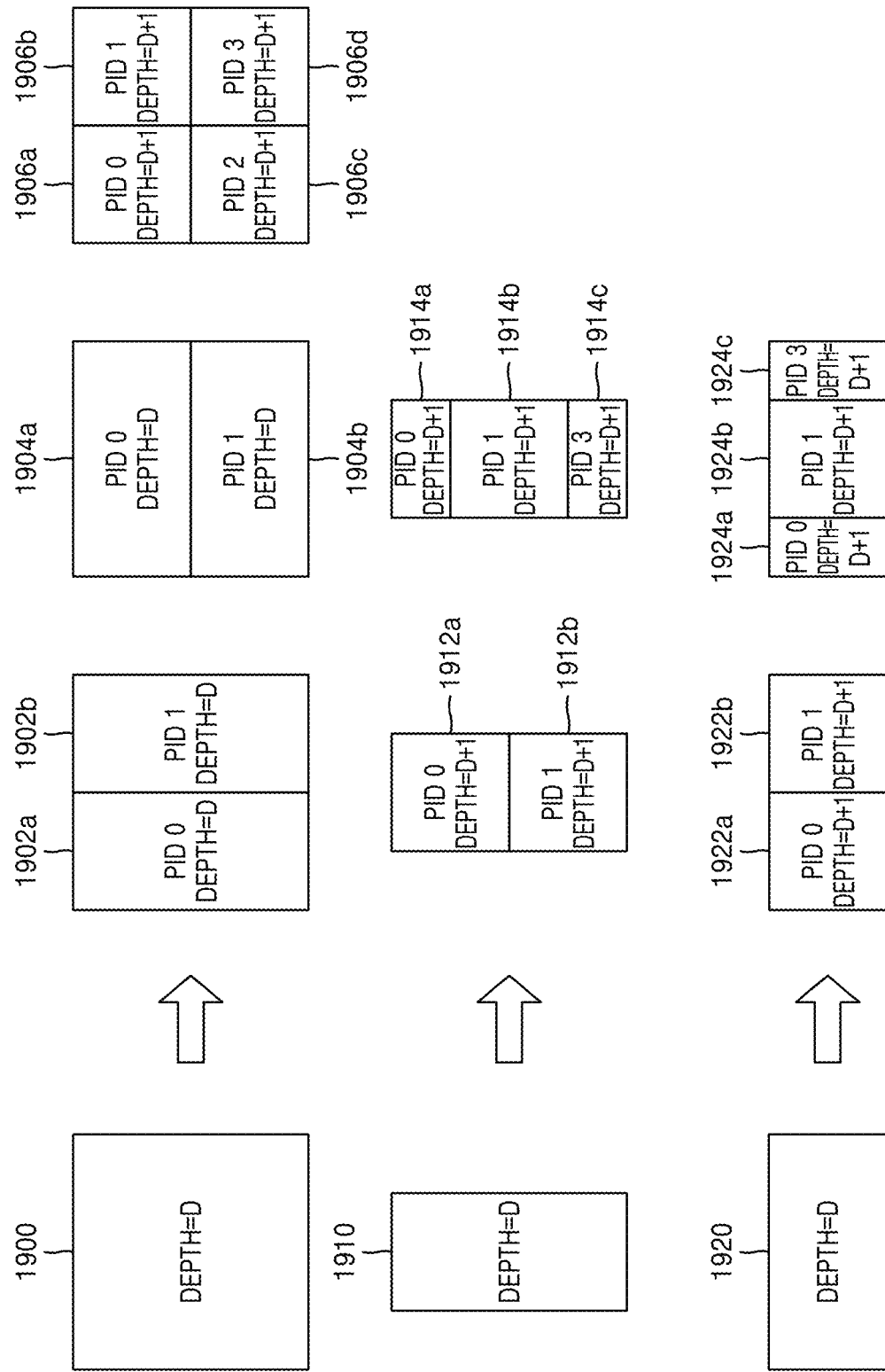
FIG. 19 illustrates depths that are determinable based on shapes and sizes of coding units, and part indexes (PIDs) that are for distinguishing the coding units, according to an embodiment.

FIG. 19 illustrates depths that are determinable based on shapes and sizes of coding units, and part indexes (PIDs) that are for distinguishing the coding units, according to an embodiment.

According to an embodiment, the video decoding apparatus 100 may determine various-shape second coding units by splitting a square first coding unit 1900. Referring to FIG. 19, the video decoding apparatus 100 may determine second coding units 1902*a* and 1902*b*, 1904*a* and 1904*b*, and 1906*a*, 1906*b*, 1906*c*, and 1906*d* by splitting the first coding unit 1900 in at least one of vertical and horizontal directions based on information regarding the split type mode. That is, the video decoding apparatus 100 may determine the second coding units 1902*a* and 1902*b*, 1904*a* and 1904*b*, and 1906*a*, 1906*b*, 1906*c*, and 1906*d*, based on the information regarding the split type mode of the first coding unit 1900.

According to an embodiment, a depth of the second coding units 1902*a* and 1902*b*, 1904*a* and 1904*b*, and 1906*a*, 1906*b*, 1906*c*, and 1906*d*, which are determined based on the information regarding the split type mode of the square first coding unit 1900, may be determined based on the length of a long side thereof. For example, because the length of a side of the square first coding unit 1900 equals the length of a long side of the non-square second coding units 1902*a* and 1902*b*, and 1904*a* and 1904*b*, the first coding unit 1900 and the non-square second coding units 1902*a* and 1902*b*, and 1904*a* and 1904*b* may have the same depth, e.g., D. However, when the video decoding apparatus 100 splits the first coding unit 1900 into the four square second coding units 1906*a*, 1906*b*, 1906*c*, and 1906*d* based on the information regarding the split type mode, because the length of a side of the square second coding units 1906*a*, 1906*b*, 1906*c*, and 1906*d* is ½ times the length of a side of the first coding unit 1900, a depth of the second coding units 1906*a*, 1906*b*, 1906*c*, and 1906*d* may be D+1 which is deeper than the depth D of the first coding unit 1900 by 1.

According to an embodiment, the video decoding apparatus 100 may determine a plurality of second coding units 1912*a* and 1912*b*, and 1914*a*, 1914*b*, and 1914*c* by splitting a first coding unit 1910, a height of which is longer than a width, in a horizontal direction based on the information regarding the split type mode. According to an embodiment, the video decoding apparatus 100 may determine a plurality of second coding units 1922*a* and 1922*b*, and 1924*a*, 1924*b*, and 1924*c* by splitting a first coding unit 1920, a width of which is longer than a height, in a vertical direction based on the information regarding the split type mode.

According to an embodiment, a depth of the second coding units 1912*a* and 1912*b*, 1914*a*, 1914*b*, and 1916*a*, 1916*b*, 1916*c*, and 1916*d*, which are determined based on the information regarding the split type mode of the non-square first coding unit 1910 or 1920, may be determined based on the length of a long side thereof. For example, because the length of a side of the square second coding units 1912*a* and 1912*b* is ½ times the length of a long side of the first coding unit 1910 having a non-square shape, a height of which is longer than a width, a depth of the square second coding units 1912*a* and 1912*b* is D+1 which is deeper than the depth D of the non-square first coding unit 1910 by 1.

Furthermore, the video decoding apparatus 100 may split the non-square first coding unit 1910 into an odd number of second coding units 1914*a*, 1914*b*, and 1914*c* based on the information regarding the split type mode. The odd number of second coding units 1914*a*, 1914*b*, and 1914*c* may include the non-square second coding units 1914*a* and 1914*c* and the square second coding unit 1914*b*. In this case, because the length of a long side of the non-square second coding units 1914*a* and 1914*c* and the length of a side of the square second coding unit 1914*b* are ½ times the length of a long side of the first coding unit 1910, a depth of the second coding units 1914*a*, 1914*b*, and 1914*c* may be D+1 which is deeper than the depth D of the non-square first coding unit 1910 by 1. The video decoding apparatus 100 may determine depths of coding units split from the first coding unit 1920 having a non-square shape, a width of which is longer than a height, by using the above-described method of determining depths of coding units split from the first coding unit 1910.

According to an embodiment, the video decoding apparatus 100 may determine PIDs for identifying split coding units, based on a size ratio between the coding units when an odd number of split coding units do not have equal sizes. Referring to FIG. 19, a coding unit 1914*b* of a center location among an odd number of split coding units 1914*a*, 1914*b*, and 1914*c* may have a width equal to that of the other coding units 1914*a* and 1914*c* and a height which is two times that of the other coding units 1914*a* and 1914*c*. That is, in this case, the coding unit 1914*b* at the center location may include two of the other coding unit 1914*a* or 1914*c*. Therefore, when a PID of the coding unit 1914*b* at the center location is 1 based on a scan order, a PID of the coding unit 1914*c* located next to the coding unit 1914*b* may be increased by 2 and thus may be 3. That is, discontinuity in PID values may be present. According to an embodiment, the video decoding apparatus 100 may determine whether an odd number of split coding units do not have equal sizes, based on whether discontinuity is present in PIDs for identifying the split coding units.

According to an embodiment, the video decoding apparatus 100 may determine whether to use a specific splitting method, based on PID values for identifying a plurality of coding units determined by splitting a current coding unit. Referring to FIG. 19, the video decoding apparatus 100 may determine an even number of coding units 1912*a* and 1912*b* or an odd number of coding units 1914*a*, 1914*b*, and 1914*c* by splitting the first coding unit 1910 having a rectangular shape, a height of which is longer than a width. The video decoding apparatus 100 may use PIDs to identify respective coding units. According to an embodiment, the PID may be obtained from a sample of a predetermined location of each coding unit (e.g., a top left sample).

According to an embodiment, the video decoding apparatus 100 may determine a coding unit at a predetermined location from among the split coding units, by using the PIDs for distinguishing the coding units. According to an embodiment, when the information regarding the split type mode of the first coding unit 1910 having a rectangular shape, a height of which is longer than a width, indicates to split a coding unit into three coding units, the video decoding apparatus 100 may split the first coding unit 1910 into three coding units 1914*a*, 1914*b*, and 1914*c*. The video decoding apparatus 100 may assign a PID to each of the three coding units 1914*a*, 1914*b*, and 1914*c*. The video decoding apparatus 100 may compare PIDs of an odd number of split coding units to determine a coding unit at a center location from among the coding units. The video decoding apparatus 100 may determine the coding unit 1914*b* having a PID corresponding to a middle value among the PIDs of the coding units, as the coding unit at the center location from among the coding units determined by splitting the first coding unit 1910. According to an embodiment, the video decoding apparatus 100 may determine PIDs for distinguishing split coding units, based on a size ratio between the coding units when the split coding units do not have equal sizes. Referring to FIG. 19, the coding unit 1914*b* generated by splitting the first coding unit 1910 may have a width equal to that of the other coding units 1914*a* and 1914*c* and a height which is two times that of the other coding units 1914*a* and 1914*c*. In this case, when the PID of the coding unit 1914*b* at the center location is 1, the PID of the coding unit 1914*c* located next to the coding unit 1914*b* may be increased by 2 and thus may be 3. When the PID is not uniformly increased as described above, the video decoding apparatus 100 may determine that a coding unit is split into a plurality of coding units including a coding unit having a size different from that of the other coding units. According to an embodiment, when the information regarding the split type mode indicates to split a coding unit into an odd number of coding units, the video decoding apparatus 100 may split a current coding unit in such a manner that a coding unit of a predetermined location among an odd number of coding units (e.g., a coding unit of a center location) has a size different from that of the other coding units. In this case, the video decoding apparatus 100 may determine the coding unit of the center location, which has a different size, by using PIDs of the coding units. However, the PIDs and the size or location of the coding unit of the predetermined location are not limited to the above-described examples, and various PIDs and various locations and sizes of coding units may be used.

According to an embodiment, the video decoding apparatus 100 may use a predetermined data unit where a coding unit starts to be recursively split.

Figure 20:
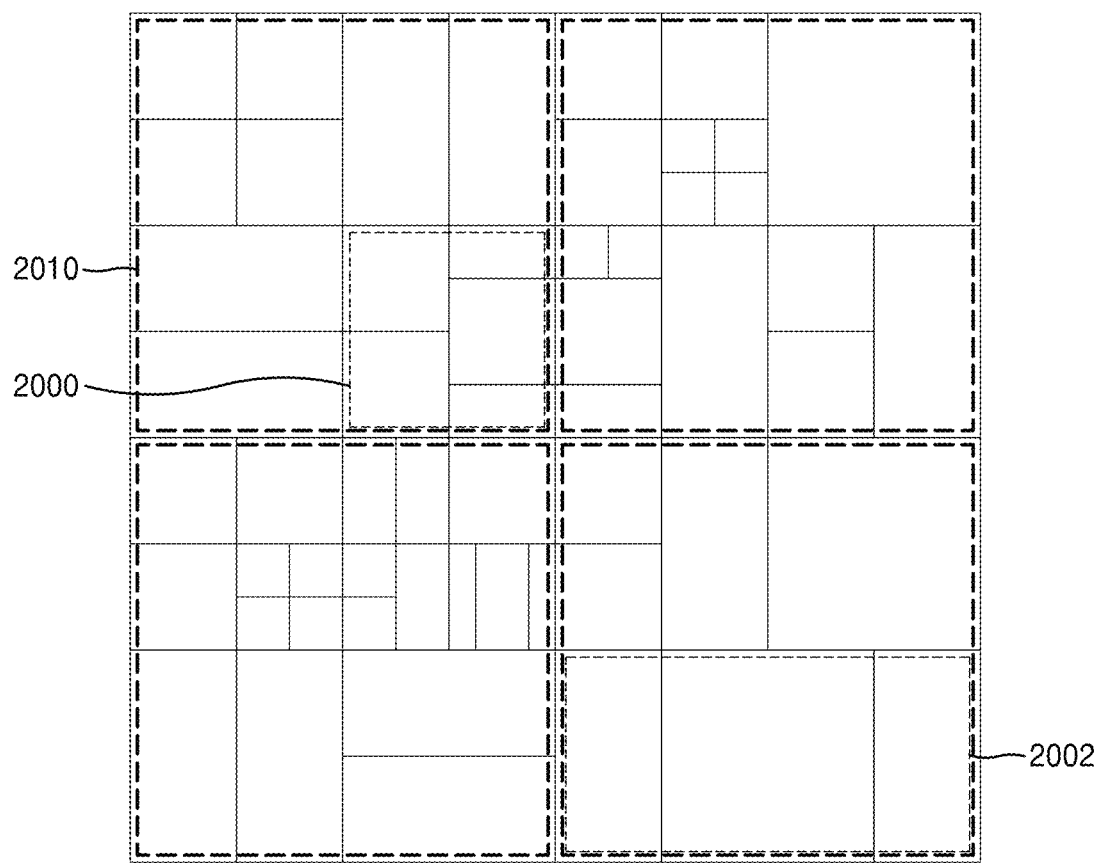
FIG. 20 illustrates that a plurality of coding units are determined based on a plurality of predetermined data units included in a picture, according to an embodiment.

FIG. 20 illustrates that a plurality of coding units are determined based on a plurality of predetermined data units included in a picture, according to an embodiment.

According to an embodiment, a predetermined data unit may be defined as a data unit where a coding unit starts to be recursively split by using at least one of block shape information and information regarding the split type mode. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined size shape. According to an embodiment, a reference coding unit may include M×N samples. Herein, M and N may be equal to each other, and may be integers expressed as multipliers of 2. That is, the reference data unit may have a square or non-square shape, and may be split into an integer number of coding units.

According to an embodiment, the video decoding apparatus 100 may split the current picture into a plurality of reference data units. According to an embodiment, the video decoding apparatus 100 may split the plurality of reference data units, which are split from the current picture, by using splitting information about each reference data unit. The operation of splitting the reference data unit may correspond to a splitting operation using a quadtree structure.

According to an embodiment, the video decoding apparatus 100 may previously determine the minimum size allowed for the reference data units included in the current picture. Accordingly, the video decoding apparatus 100 may determine various reference data units having sizes equal to or greater than the minimum size, and may determine one or more coding units by using the block shape information and the information regarding the split type mode with reference to the determined reference data unit.

Referring to FIG. 20, the video decoding apparatus 100 may use a square reference coding unit 2000 or a non-square reference coding unit 2002. According to an embodiment, the shape and size of reference coding units may be determined based on various data units capable of including one or more reference coding units (e.g., sequences, pictures, slices, slice segments, largest coding units, or the like).

According to an embodiment, the receiver of the video decoding apparatus 100 may obtain, from a bitstream, at least one of reference coding unit shape information and reference coding unit size information with respect to each of the various data units. An operation of splitting the square reference coding unit 2000 into one or more coding units has been described above in relation to the operation of splitting the current coding unit 300 of FIG. 8, and an operation of splitting the non-square reference coding unit 2002 into one or more coding units has been described above in relation to the operation of splitting the current coding unit 900 or 950 of FIG. 9. Thus, detailed descriptions thereof will not be provided herein.

According to an embodiment, the video decoding apparatus 100 may use a PID for identifying the size and shape of reference coding units, to determine the size and shape of reference coding units according to some data units previously determined based on a predetermined condition. That is, the receiver may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, largest coding units, or the like). The video decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the video decoding apparatus 100 may determine at least one of the size and shape of reference coding units included in a data unit serving as a unit for obtaining the PID, by selecting the previously determined at least one of the size and shape of reference coding units based on the PID.

According to an embodiment, the video decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the video decoding apparatus 100 may determine the reference coding units by splitting the largest coding unit n times based on a quadtree structure, and may split the reference coding unit based on at least one of the block shape information and the information regarding the split type mode according to various embodiments.

Figure 21:
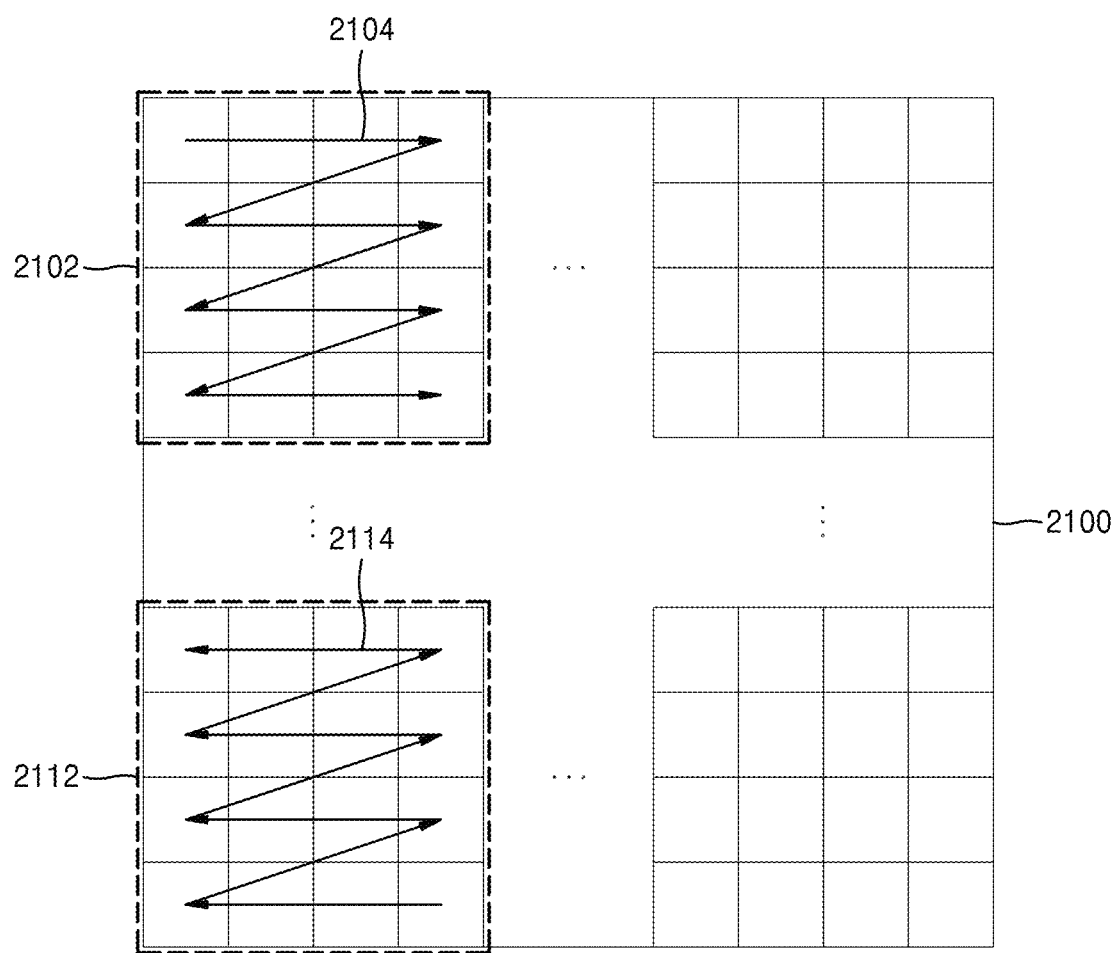
FIG. 21 illustrates a processing block serving as a unit for determining a determination order of reference coding units included in a picture, according to an embodiment.

FIG. 21 illustrates a processing block serving as a unit for determining a determination order of reference coding units included in a picture 2100, according to an embodiment.

According to an embodiment, the video decoding apparatus 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the video decoding apparatus 100 may obtain processing block size information and may determine the size of one or more processing blocks included in the picture. The video decoding apparatus 100 may obtain the processing block size information from a bitstream and may determine the size of one or more processing blocks included in the picture. The size of processing blocks may be a predetermined size of data units, which is indicated by the processing block size information.

According to an embodiment, the receiver of the video decoding apparatus 100 may obtain the processing block size information from the bitstream according to each specific data unit. For example, the processing block size information may be obtained from the bitstream in a data unit such as an image, sequence, picture, slice, or slice segment. That is, the receiver may obtain the processing block size information from the bitstream according to each of the various data units, and the video decoding apparatus 100 may determine the size of one or more processing blocks, which are split from the picture, by using the obtained processing block size information. The size of the processing blocks may be integer times that of the reference coding units.

According to an embodiment, the video decoding apparatus 100 may determine the size of processing blocks 2102 and 2112 included in the picture 2100. For example, the video decoding apparatus 100 may determine the size of processing blocks based on the processing block size information obtained from the bitstream. Referring to FIG. 21, according to an embodiment, the video decoding apparatus 100 may determine a width of the processing blocks 2102 and 2112 to be four times the width of the reference coding units, and may determine a height of the processing blocks 2102 and 2112 to be four times the height of the reference coding units. The video decoding apparatus 100 may determine a determination order of one or more reference coding units in one or more processing blocks.

According to an embodiment, the video decoding apparatus 100 may determine the processing blocks 2102 and 2112, which are included in the picture 2100, based on the size of processing blocks, and may determine a determination order of one or more reference coding units in the processing blocks 2102 and 2112. According to an embodiment, determination of reference coding units may include determination of the size of the reference coding units.

According to an embodiment, the video decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the video decoding apparatus 100 may obtain, from the bitstream, the determination order information of reference coding units according to each specific data unit. For example, the receiver may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the video decoding apparatus 100 may determine one or more reference coding units based on the determined determination order.

According to an embodiment, the receiver may obtain the determination order information of reference coding units from the bitstream as information related to the processing blocks 2102 and 2112, and the video decoding apparatus 100 may determine a determination order of one or more reference coding units included in the processing blocks 2102 and 2112 and determine one or more reference coding units, which are included in the picture 2100, based on the determination order. Referring to FIG. 21, the video decoding apparatus 100 may determine determination orders 2104 and 2114 of one or more reference coding units in the processing blocks 2102 and 2112, respectively. For example, when the determination order information of reference coding units is obtained with respect to each processing block, different types of the determination order information of reference coding units may be obtained for the processing blocks 2102 and 2112. When the determination order 2104 of reference coding units in the processing block 2102 is a raster scan order, reference coding units included in the processing block 2102 may be determined according to a raster scan order. On the contrary, when the determination order 2114 of reference coding units in the other processing block 2112 is a backward raster scan order, reference coding units included in the processing block 2112 may be determined according to the backward raster scan order.

According to an embodiment, the video decoding apparatus 100 may decode the determined one or more reference coding units. The video decoding apparatus 100 may decode an image, based on the reference coding units determined as described above. A method of decoding the reference coding units may include various image decoding methods.

According to an embodiment, the video decoding apparatus 100 may obtain block shape information indicating the shape of a current coding unit or information regarding the split type mode indicating a splitting method of the current coding unit, from the bitstream, and may use the obtained information. The block shape information or the information regarding the split type mode may be included in the bitstream related to various data units. For example, the video decoding apparatus 100 may use the block shape information or the information regarding the split type mode included in a sequence parameter set, a picture parameter set, a video parameter set, a slice header, or a slice segment header. Furthermore, the video decoding apparatus 100 may obtain, from the bitstream, a syntax element corresponding to the block shape information or the information regarding the split type mode according to each largest coding unit, each reference coding unit, or each processing block, and may use the obtained syntax element.

A method of determining a splitting rule according to an embodiment of the present disclosure will be described below in detail.

The video decoding apparatus 100 may determine a rule of splitting an image. The splitting rule may be predetermined between the video decoding apparatus 100 and the video encoding apparatus 300. The video decoding apparatus 100 may determine a rule of splitting an image, based on information obtained from a bitstream. The video decoding apparatus 100 may determine the splitting rule, based on information obtained from at least one of a sequence parameter set, a picture parameter set, a video parameter set, a slice header, or a slice segment header. The video decoding apparatus 100 may determine the splitting rule differently according to a frame, a slice, a temporal layer, a largest coding unit, or a coding unit.

The video decoding apparatus 100 may determine the splitting rule, based on block shape information of a coding unit. The video decoding apparatus 100 may determine the block shape information of the coding unit. The block shape information may include information regarding a size, a shape, a ratio between a width and a height, and a direction of the coding unit. The video encoding apparatus 300 and the video decoding apparatus 100 may determine in advance to determine the splitting rule based on the block shape information of the coding unit. However, embodiments are not limited thereto. The video decoding apparatus 100 may determine the splitting rule, based on information obtained from a bitstream received from the video encoding apparatus 300.

A shape of the coding unit may include a square shape and a non-square shape. When the width and height of the coding unit are the same, the video decoding apparatus 100 may determine a shape of the coding unit to be a square. When the width and height of the coding unit are not the same, the video decoding apparatus 100 may determine the shape of the coding unit to be a non-square.

A size of the coding unit may include various sizes of 4×4, 8×4, 4×8, 8×8, 16×4, 16×8, . . . , 256×256. The size of the coding unit may be classified according to the length of a long side and the length or width of a short side of the coding unit. The video decoding apparatus 100 may apply the same splitting rule to coding units classified as the same group. For example, the video decoding apparatus 100 may classify coding units of which long sides are the same in length as coding units having the same size. The video decoding apparatus 100 may apply the same splitting rule to coding units of which long sides are the same in length.

The ratio between the width and height of the coding unit may include 1:2, 2:1, 1:4, 4:1, 1:8, 8:1, 1:16, 16:1, or the like. The direction of the coding unit may include a horizontal direction and a vertical direction. The horizontal direction may represent a case in which the width of the coding unit is longer than the height thereof. The vertical direction may represent a case in which the width of the coding unit is shorter than the height thereof.

The video decoding apparatus 100 may adaptively determine the splitting rule, based on the size of a coding unit. The video decoding apparatus 100 may differently determine a permissible split type mode, based on the size of the coding unit. For example, the video decoding apparatus 100 may determine whether splitting is permitted, based on the size of the coding unit. The video decoding apparatus 100 may determine a splitting direction according to the size of the coding unit. The video decoding apparatus 100 may determine a permissible split type, based on the size of the coding unit.

The determination of the splitting rule based on the size of the coding unit may be a splitting rule predetermined between the video encoding apparatus 300 and the video decoding apparatus 100. The video decoding apparatus 100 may determine the splitting rule, based on information obtained from a bitstream.

The video decoding apparatus 100 may adaptively determine the splitting rule, based on a position of the coding unit. The video decoding apparatus 100 may adaptively determine the splitting rule, based on a position of the coding unit in the image.

Alternatively, the video decoding apparatus 100 may determine the splitting rule such that coding units generated by different split paths do not have the same block shape. However, the present disclosure is not limited thereto and coding units generated by different split paths may have the same block shape. Coding units generated by different split paths may be decoded in different processing orders. A decoding processing procedure has been described above with reference to FIG. 17 and thus a detailed description thereof will be omitted.

Various embodiments have been described above. It will be understood by those of ordinary skill in the art that the present disclosure may be embodied in many different forms without departing from essential features of the present disclosure. Therefore, the embodiments set forth herein should be considered in a descriptive sense only and not for purposes of limitation. The scope of the present disclosure is set forth in the claims rather than in the foregoing description, and all differences falling within a scope equivalent thereto should be construed as being included in the present disclosure.

The above-described embodiments of the present disclosure may be written as a computer executable program and implemented by a general-purpose digital computer which operates the program via a computer-readable recording medium. The computer-readable recording medium may include a storage medium such as a magnetic storage medium (e.g., a ROM, a floppy disk, a hard disk, etc.) and an optical recording medium (e.g., a CD-ROM, a DVD, etc.).

The invention claimed is:

1. A video decoding method comprising:
    obtaining, from a bitstream, information about a multi-core transformation according to a size of a current block and whether a specific tool is applied or not, the information about the multi-core transformation indicating which transform kernel set among a plurality of transform kernel sets is to be applied, wherein the transform kernel set includes a horizontal transform kernel for inverse transformation of the current block in a horizontal direction and a vertical transform kernel for inverse transformation of the current block in a vertical direction;
    determining the horizontal transform kernel and the vertical transform kernel according to the information about the multi-core transformation;
    obtaining transform coefficients of the current block by performing an inverse-quantization on quantized transform coefficients of the current block; and
    performing the inverse transformation on the transform coefficients of the current block by using the horizontal transform kernel and the vertical transform kernel.

2. A video encoding method comprising:
    determining a horizontal transform kernel for transformation of a current block in a horizontal direction and a vertical transform kernel for transformation of the current block in a vertical direction;
    obtaining transform coefficients of the current block by performing the transformation on the current block using the horizontal transform kernel and the vertical transform kernel;
    performing a quantization on the transform coefficients of the current block; and
    generating information about a multi-core transformation according to a size of the current block and whether a specific tool is applied or not, the information about the multi-core transformation indicating which transform kernel set among a plurality of transform kernel sets is to be applied, wherein the transform kernel set includes the horizontal transform kernel and the vertical transform kernel.

3. A non-transitory computer-readable medium for recording a bitstream, the bitstream comprising:
    information about a multi-core transformation,
    wherein, the information about the multi-core transformation is obtained by:
    determining a horizontal transform kernel for transformation of a current block in a horizontal direction and a vertical transform kernel for transformation of the current block in a vertical direction;
    obtaining transform coefficients of the current block by performing the transformation on the current block using the horizontal transform kernel and the vertical transform kernel;
    performing a quantization on the transform coefficients of the current block; and
    generating the information about the multi-core transformation according to a size of the current block and whether a specific tool is applied or not, the information about the multi-core transformation indicating which transform kernel set among a plurality of transform kernel sets is to be applied, wherein the transform kernel set includes the horizontal transform kernel and the vertical transform kernel.

* * * * *